(12) United States Patent
Fricke

(10) Patent No.: US 6,224,341 B1
(45) Date of Patent: *May 1, 2001

(54) DAMPING SYSTEMS FOR VIBRATING MEMBERS

(75) Inventor: J. Robert Fricke, Belmont, MA (US)

(73) Assignee: Edge Innovations & Technology, LLC, Belmont, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/169,432

(22) Filed: Oct. 9, 1998

Related U.S. Application Data

(63) Continuation of application No. PCT/US97/16575, filed on Sep. 17, 1997, and a continuation-in-part of application No. 08/731,251, filed on Oct. 11, 1996, now Pat. No. 5,820,348

(60) Provisional application No. 60/026,234, filed on Sep. 17, 1996.

(51) Int. Cl.[7] ................... F01D 5/10; F01D 5/26

(52) U.S. Cl. .................. 416/248; 416/500; 464/180; 188/268; 188/378; 74/574

(58) Field of Search .................. 416/144, 145, 416/248, 500; 415/119, 213.1; 464/180; 188/268, 378; 267/90, 136, 146; 440/49, 52; 74/574; 52/167.4, 720.1, 732.1, 738.1; 244/123, 124, 133; 248/633, 636; 181/199, 207, 208; 381/353, 354

(56) References Cited

U.S. PATENT DOCUMENTS

| | | |
|---|---|---|
| 1,894,276 | 1/1933 | Lampton . |
| 2,862,686 | 12/1958 | Bartlett . |
| 2,877,980 | 3/1959 | Stalker . |
| 2,984,453 | 5/1961 | Heymann . |
| 3,586,460 | 6/1971 | Toner . |
| 3,733,923 | 5/1973 | Goodrich et al. . |
| 3,812,724 | 5/1974 | Curtz et al. . |

(List continued on next page.)

FOREIGN PATENT DOCUMENTS

| | | |
|---|---|---|
| 0335 299 | 3/1988 | (EP) . |
| 2557974 | 1/1984 | (FR) . |
| 943023 | 4/1960 | (GB) . |
| 57140501 | 8/1982 | (JP) . |
| 98/12449 | 3/1998 | (WO) . |

OTHER PUBLICATIONS

Walton, K., "The Effective Elastic Moduli of a Random Packing of Spheres," J. Mech. Phys. Solids, vol. 35, No. 2, pp. 213–226 (1987).

House, J. R., "Damping Hollow Tubular Structures with 'Lightweight' Viscoelastic Spheres," Proceedings of the ACS Division of Polymeric Materials: Science and Engineering, American Chemical Society, pp. 734–738 (1989).

* cited by examiner

Primary Examiner—Christopher Verdier
(74) Attorney, Agent, or Firm—Hamilton, Brook, Smith & Reynolds, P.C.

(57) ABSTRACT

The invention relates to the use of low-density granular fill with a specific gravity less than 1.5, placed in hollow cavities built into turbomachinery blades, vanes, and shafts. The granular fill provides effective damping at lower frequencies than conventional passive damping treatment due to its low bulk compressional sound speed. Selected materials used for the granular fill treatment are chosen for specific turbomachinery needs, including temperature of operation. Rotation speed is also a factor because it induces on the granular material an apparent hydrostatic pressure associated with the centripetal acceleration, and sound speed in granular materials is a function of pressure raised to the power 1/n. Preferred designs for placement of low-density granular material in appendages and shafts are found using an iterative design tool based on the Direct Global Stiffness Matrix method.

29 Claims, 10 Drawing Sheets

U.S. PATENT DOCUMENTS

| | | |
|---|---|---|
| 3,966,357 | 6/1976 | Corsmeier . |
| 3,986,792 | 10/1976 | Warner . |
| 3,999,887 | 12/1976 | McGuire . |
| 4,135,849 | 1/1979 | Pigott . |
| 4,182,598 | 1/1980 | Nelson . |
| 4,440,834 | 4/1984 | Aubert et al. . |
| 4,453,887 | 6/1984 | Schucker . |
| 4,460,314 | 7/1984 | Fuller . |
| 4,772,450 | 9/1988 | Friedman . |
| 4,842,095 * | 6/1989 | Rozek ................................. 181/207 |
| 4,869,645 | 9/1989 | Verpoort . |
| 4,872,812 | 10/1989 | Hendley et al. . |
| 5,016,602 | 5/1991 | Mizek . |
| 5,020,644 | 6/1991 | Novoa . |
| 5,052,890 | 10/1991 | Roberts . |
| 5,108,262 | 4/1992 | Crane . |
| 5,129,284 | 7/1992 | Brueckner et al. . |
| 5,131,052 * | 7/1992 | Hill et al. ............................. 181/199 |
| 5,177,036 | 1/1993 | Kunst et al. . |
| 5,195,930 | 3/1993 | Hirano et al. . |
| 5,197,707 | 3/1993 | Kohan . |
| 5,215,442 | 6/1993 | Steckle et al. . |
| 5,228,835 | 7/1993 | Chlus . |
| 5,261,790 | 11/1993 | Dietz et al. . |
| 5,290,973 * | 3/1994 | Kwoh ................................... 181/207 |
| 5,302,085 | 4/1994 | Dietz et al. . |
| 5,313,786 | 5/1994 | Chlus et al. . |
| 5,327,733 | 7/1994 | Boolchand et al. . |
| 5,345,177 | 9/1994 | Sato et al. . |
| 5,369,882 | 12/1994 | Dietz et al. . |
| 5,400,296 | 3/1995 | Cushman et al. . |
| 5,411,370 | 5/1995 | Varsik . |
| 5,460,489 | 10/1995 | Benjamin et al. . |
| 5,465,780 | 11/1995 | Muntner et al. . |
| 5,472,316 | 12/1995 | Taslim et al. . |
| 5,484,258 | 1/1996 | Isburgh et al. . |
| 5,775,049 * | 7/1998 | Fricke ................................. 52/720.1 |
| 5,820,348 | 10/1998 | Fricke . |
| 5,924,261 * | 7/1999 | Fricke ................................. 52/720.1 |

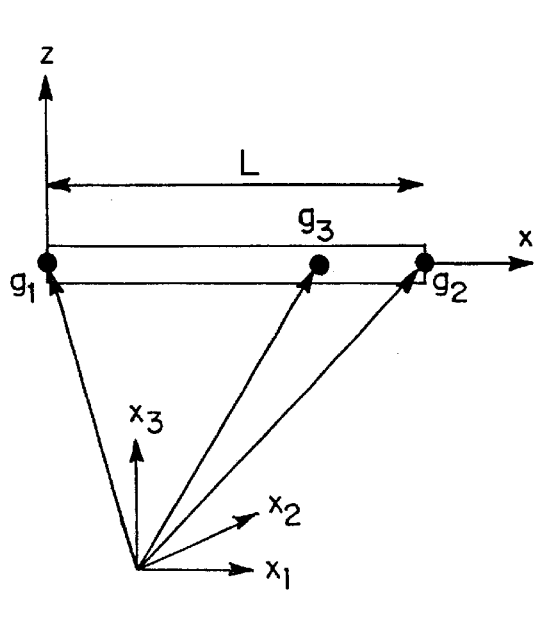
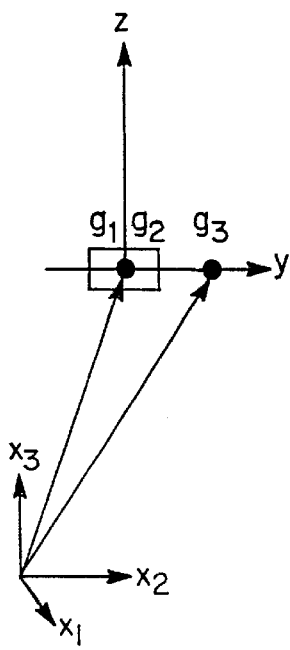
FIG. 5A
FIG. 5B
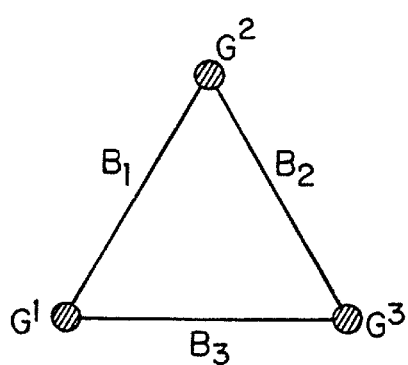
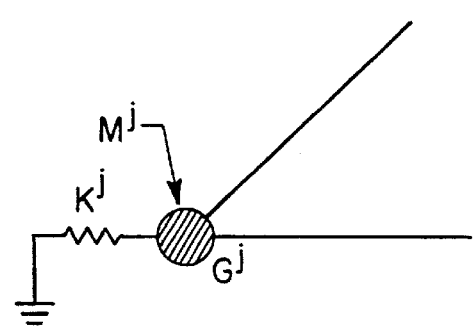
FIG. 6
FIG. 7

DAMPING SYSTEMS FOR VIBRATING MEMBERS

RELATED APPLICATION

This is a continuation application of International Application No. PCT/US97/16575 filed on Sep. 17, 1997 and is a continuation-in-part application of U.S. Ser. No. 08/731,251 filed on Oct. 11, 1996, now U.S. Pat. No. 5,820,348 and claims priority to U.S. Provisional Application No. 60/026,234, filed on Sep. 17, 1996, the teachings of these applications being incorporated herein by reference in their entirety.

BACKGROUND

Turbomachinery is used in many applications to perform work on or extract work from both gaseous and liquid fluids. Examples of such machinery includes gas turbines, axial and centrifugal fans, marine and aviation propellers, fan blades, helicopter blades and tail rotors, wind turbines, and steam and hydraulic power turbines. This machinery, by design, may contain one or more of a broad class of rotating and fixed appendages including blades, vanes, foils, and impellers depending on the needs of the particular machine. These appendages are beam-like structures, often cantilevered, and have natural frequencies of vibrations, or resonant frequencies, that are excited by mechanical vibration and fluid flow. In all turbomachinery, power is transmitted via shafts of one form or another.

Rotating appendages such as gas turbine blades are prone to vibration at critical speeds, which leads to fatigue and eventually pre-mature, and often catastrophic, failure of the component. Ensembles of such blades are components of turbines used as prime movers, such as gas turbines, as well as power generators, such as hydraulic turbines. Vibration of the turbine blades is caused by a combination of dynamic effects including imbalance of the rotating system and torsional vibration of the power transmission shaft, and fluid dynamic forcing. In certain operating conditions these phenomenon conspire to excite the natural modes of vibration in the turbine blades, and if left unchecked drive the system to failure. Natural frequencies are defined as those frequencies at which an ideal, lossless system will vibrate with zero input excitation power. In real systems, which always have a certain amount of intrinsic or added damping, the system will respond at the natural frequencies and displacement amplitude will grow to the point that damping (i.e., conversion of mechanical energy to heat) dominates or until the part fails.

Fixed appendages such as stator vanes in a gas turbine, as an example, are also subject to dynamic loading, due in part, to the fluid flow dynamics and due, in part, to coupled vibrations from other parts of the turbomachine. Like their rotating counterpart, these fixed appendages have resonant frequencies, which can be excited by system dynamics. While the fixed appendages do not have the extra load imposed by centrifugal forces, as do the rotating appendages, excitation of the components at their resonant frequency can still lead to excessive dynamic loads and thence to premature failure.

In all turbomachinery, there are one or more power transmission shafts to-which the rotating components are attached directly or indirectly. As with the other components, the transmission shafts also have resonant frequencies, which are a function of the shaft geometry, the loading imposed by the rotating appendages, and the boundary conditions imposed by the locations of the bearings holding the shaft system in place. At critical speeds, rotating shafts become dynamically unstable with large lateral amplitudes. Resonance in the shaft, as with the other components, is to be minimized so as to minimize wear on bearings, minimize cyclical fatigue of the shaft, and thus to increase the service life and reliability of the equipment.

Of the three vibrating components of turbomachinery, the rotating appendages are under the most stress and are the most difficult to treat due, in large part, to the combined effects of mechanical and fluid dynamics, the latter of which is associated with fluid turbulence. Fluid effects on rotating appendages apply as well to the fixed appendages, which are strongly affected by fluid dynamic excitation. Vibrations in shafts are only slightly affected by fluid dynamics, but complicated mechanical dynamics cause significant loads in some cases with large vibration induced motion.

While mechanical and fluid dynamic loading both result in excitation of the cantilever modes of vibration of turbine blades, their causative mechanisms are quite different. Mechanical imbalance of an ideal infinitesimally thin rotor disk, or radial array of turbine blades, only produces a radial force on each blade, and cannot, in principle, excite the bending cantilever motion that results in blade fatigue. In real systems, however, two factors contribute to the excitation of bending modes in the blades. The first is two-plane rotor imbalance, which imparts a moment at the base of the blade where it connects to the hub. The second is imperfections in the radial alignment of the turbine blade, which permits purely radial motions of the hub to excite bending motions of the blade. Two-plane rotor imbalance tends to excite bending motion in a plane parallel to the axis of the power transmission shaft and perpendicular to the plane of the turbine blade disc assembly. Misalignment of the turbine blade tends to convert radial motion of the hub into bending motion in both planes, i.e., that plane parallel to the transmission shaft and that plane parallel to the turbine blade disc assembly.

Further dynamic forcing on the blades results from torsional vibrations of the transmission shaft. These vibrations are associated with the natural torsional modes of the shaft assembly and are excited by any transient event such as changes in speed. Torsional vibration in the shaft couples to bending vibration in the turbine blades with motion primarily in the plane parallel to the turbine blade disc assembly.

The distinction between the two planes of bending motion is not clearly defined. Specifically, asymmetry of the blade shape with respect to the plane of rotation causes the two bending directions to be coupled. As a result, any attempt to minimize bending motion must be effective in both planes. The important bending plane, in fact, is that plane which runs the length of the blade and cuts through its narrowest dimension.

Fluid dynamic loading is a result of vortex shedding at the trailing edge of the (rotating or fixed) blade. Vortex shedding frequencies vary from section to section along the length of the blade due to slight variations in the blade structure and variations of the flow velocity across the blade. The range of vortex shedding frequencies for any given blade can thus span a relatively broad bandwidth. If one or more natural frequencies of the blade lie within the band of vortex shedding frequencies, then the blade will be excited into motion. In ship propellers this phenomenon is known as singing propellers. It has been found that blades with relatively straight trailing edges, as is the case for many turbine blades, are more prone to singing than those with curved trailing edges. Singing continues to excite the blade until intrinsic or added damping limits the buildup of displacement amplitude.

Previous treatments for vibration in turbomachinery appendages have focused on applying damping materials or mechanisms at point locations. The intent is to limit the maximum displacement of the component by converting the dynamic (kinetic) energy of the appendage into heat, which is innocuous in terms of the performance and service life of the machine. Placing damping treatments at localized points is effective if there exist large resonant system dynamics at the chosen point, which is not always true.

For blades and stator vanes, previous damping treatments have most often been applied at the base of the appendages, where they attach to the rest of the machine, at the tip in the form of a shroud for the blades, and at the inner and outer shroud for vanes. Damping at the base is attractive because the primary modification to the blade or vane is in the attachment configuration and does not affect the functional shape of the foil. In addition, for rotating blades, the extra weight associated with the damping treatment is subjected to reduced centrifugal forces because of its proximity to the axis of rotation. Damping at the blade tip by a shroud is effective in reducing the dynamic vibration levels of cantilevered blades, but comes at the cost of increased weight and centrifugal forces imposed on the blades and the rotor hub. Intermediate damping positions have been used in the form of snubbers that are positioned between the blades at locations part way between the blade root and tip. While effective in damping the resonant vibrations, especially if used with a shroud, the snubbers impose extra weight, and in addition, disturb the fluid flow around the appendage, which reduces the efficiency of the machine.

High temperature gas turbines are especially difficult to treat. In such situations complications beyond the high centrifugal force exist. Specifically, the design must deal with heat combined with the fact that low order modes of vibration are notoriously difficult to treat using passive damping methods. The temperature of operation in gas turbine engines, for example, is in the vicinity of 1300° F., which renders useless any conventional viscoelastic polymer or resin. Previous attempts have been made to add ceramic damping layers to the external surfaces of turbine blades, but the combination of heat and high centrifugal force renders the treatment short lived.

Other previous treatments are based on friction devices mounted at the connections between the blade and the hub. The friction devices rely on the relative motion between the blade base and the hub. With a frictional surface mounted at this location, vibrational energy is extracted from the blade and converted to heat. The shortcoming in this approach is that the motion of the blade is low at the junction between the blade and the hub. Effective passive damping is only achieved when treatments are placed at locations of large displacement.

In another approach, dynamic absorbers have been used to reduce vibration levels in many types of devices. A liquid has been placed within a chamber of a hollow blade. The liquid oscillates within the chamber, which is sized to produce a resonant frequency approximately the same as that of a dominant resonance in the blade. The combination of the blade resonance and the fluid resonance form, in a simplified analogy, a two degree-of-freedom system in which energy from the blade, which has low intrinsic damping is coupled to energy in the liquid, which through proper selection of viscosity, has high intrinsic damping. The deficiency of this approach is that the dynamic absorber formed by the liquid oscillator only extracts energy from the blade in a relatively narrow band of frequencies. Since the excitation mechanism is broadband (a combination of fluid dynamic vortex shedding and mechanical vibrations with many harmonics) then a narrowband absorber will only provide partial relief. Dynamic absorbers have also been used for damping shafts.

In still another previous approach, treatment of vibrations associated with power transmission shafts and structural acoustics have included high-density granular fill such as sand or lead shot. Broadband treatment has been achieved by filling hollow shafts with sand, but the enhanced performance comes at the cost of a substantial weight increase that is unsuitable for many applications.

SUMMARY OF THE INVENTION

The present invention provides a solution to the shortcomings of the prior art in terms of proper placement of the treatment and broadband effectiveness even at low-frequencies. A preferred embodiment of the invention is directed to the manufacture and use of hollow turbomachinery appendages and shafts that are selectively filled with a damping material. The manufacturing of hollow or chambered members is routine in the construction of air-cooled vanes and blades for gas turbines and similar techniques can be used for other types of members or appendages. Hollow transmission shafts are routinely manufactured for many applications.

A low density granular fill material is placed within the hollow portions of the blades, and the shafts of a system having rotating members. Other preferred embodiments include selected distribution of fill material for stator vanes, fan blades, various types of ducted and unducted marine propellers, aviation propellers, aircraft airfoils, and others. The low-density granular fill can be applied without altering the shape of the structure being dampened. To reduce vibrations, the preferred distribution of low-density granular fill in different appendages and shafts is dependent on the geometry of the material and operating conditions of the articles. For the purposes of the present application, "low density granular material" is defined as a granular material having a specific gravity of less than 1.5.

Rotor or stator elements, or other members referenced above, are often within a fluid flowing in laminar or non-laminar form relative to the element. The effects of fluid flow on the vibrational characteristics of the member within the flow can vary greatly, depending upon the nature of the fluid and the forces imparted by the fluid on the member. Vibrations induced by fluid flow are superposed on vibrations caused by machine imbalance and mechanical vibration. The combination of these two forcing mechanisms establish the total vibrational characteristics of the member.

Structural resonances of an undamped beam can often be reduced 10–20 dB by damping the beam with low density granular fill. These teachings are described in U.S. patent application Ser. No. 08/662,167, filed on Jun. 12, 1996, now U.S. Pat. No. 5,775,649, the contents of which is incorporated herein by reference in its entirety. Broadband damping of induced vibration is achieved with the application of a low-density granular fill within the void of hollow system components. Partial filling of a hollow structure also results in significant damping if the positions and component chosen for filling constitute regions of active vibration dynamics. Structures can have a plurality of internal filled chambers positioned to optimize damping. Using this approach, light weight granular fill is used strategically only where it positively reduces system vibration. For many applications, the use of granular materials having specific gravities in the range of 0.05 to 0.6 are preferred. For stationary structures such as stators or moving machinery where weight is not critical such as turbomachinery in power plants, granular materials having specific gravities in the range of 0.6 to 1.5 can be used.

The choice of fill material for any given application can be important. Specifically, matters of weight, tolerance to high temperature, cost, damping effectiveness, ease of handling, and environmental friendliness are all important. For high-temperature applications the most important feature can be to prevent melting of the granular material within the structure. Ceramic materials that are both porous (low-density) and have high melting points can be readily manufactured, and can serve as a treatment for passive damping of structural vibrations. Such materials maintain their integrity even at elevated temperatures.

Ceramics are a broad class of materials usually made from clays, which are composed chiefly of the aluminosilicate minerals kaolinite, illite, and montmorillonite. The clays are combined with water to make thick paste slurries which are then formed into shapes and dried at relatively low temperature, less than about 200° C. The dried forms are then fired at temperatures in the vicinity of 1100° C. to produce the ceramic material, which is resistant to abrasion, heat, and chemical corrosion. Various methods can be employed for producing porous granular ceramic materials with specific gravities as low as 0.2 and grain sizes of a few millimeters or less. Such material can be used as a low-density granular fill treatment in heat critical applications.

Other materials suitable for high temperature applications include ores or refractory materials that are processed to produce light weight, low density materials such as perlite and vermiculite. These materials can be fabricated by flash heating of water bearing ore. As the water evaporates a porous material is produced that remains stable at temperatures above 800° C. and is thus suitable for damping of vibration at high temperatures.

Added forces due to centrifugal acceleration in rotating appendages is another difficulty which can be considered and addressed in the design of a damping system. Analytical results have found that the sound speed of an idealized granular material goes as $c \, p^{1/6}$, where c is sound speed and p is pressure. Results have previously been obtained for lead shot, which is a high-density granular material and not appropriate for many applications. It follows quite closely to the ⅙ power law predicted by theory. In other materials, such as Scotchlite® glass micro-bubbles, the power law goes approximately as $p^{1/4}$. With these relations, the sound speed of the granular material can be computed as a function of rotation speed for the turbine. The low sound speed of the granular material is what enables the attenuation mechanism to become active. With a specification on the rotation speed of the appendage, and other characteristics (e.g., size and material), and a knowledge of the relationship between sound speed and pressure, a granular material can be specified to provide effective damping of the vibrational modes.

The low-density granular fill can also be solid, hollow, spherical in shape, or dendritic in shape. By mixing together two or more types of low-density granular fill having different characteristics, the sound speed and overall mass of the fill mixture can be selected.

Not only is it important to choose the proper low-density granular fill material, but the choice of where to place the material is important. Specifically, the material needs to be placed where the system dynamics are high. Certainly one way to do this is to put the material everywhere, but this leads to unnecessary weight in the total structure. To determine placement of the material, software tools, such as the Direct Global Stiffness Matrix (DGSM) method are used to construct an iterative design tool. This method is described in the paper-by J. Robert Fricke and Mark A. Hayner, "Direct Global Stiffness Matrix Method for 3-D Truss Dynamics," ASME 15th Biennial Conference on Mechanical Vibration and Noise, Sep. 17–21, 1995 the contents of which is incorporated herein by reference in its entirety. For simple systems, such as beams of uniform cross-section, the system dynamics can be computed analytically. In such a system, the effect of adding a high-loss granular fill subsystem can also be computed analytically once the subsystem loss factor, $\eta$, is known as a function of frequency. In more complicated systems including those with varying beam element cross-section, varying material properties, and varying pre-stress, the optimum design cannot be computed analytically except for relatively simple systems.

Specifically, for turbomachinery members, the cross-section of the structures vary and the rotating members have varying pre-stress as a function of radial position due to centrifugal forces. In such cases where analytical solutions are not possible, a design tool based on DGSM can provide information on the optimum placement of granular fill material, and if several materials are available, the proper choice of material in each location. The design tool is based on an iterative process wherein a cost function is minimized. When the minimum cost is found, then the system parameters are used to specify the preferred design of the damping system. The cost function can be defined in different ways for different applications. Factors such as rms velocity, weight of granular material, ease of handling, cost of material, and other criteria can be built into the cost function. Both quantitative and qualitative measures can be included.

Once the cost function is defined, an iterative search through the design parameter space is performed using either deterministic non-linear search methods, such as steepest decent gradient search, or stochastic non-linear search methods, such as simulated annealing. The parameters in the design space can be restricted to the placement of granular fill, e.g., type and amount as a function of position in the structure, or can also include design parameters associated with the base structure, e.g., wall thickness, cross-sectional dimension, or material properties. In the former case, the base structure, say a turbine blade, is taken as a given and only the granular fill damping treatment is permitted to vary. In the latter case, the base structure parameters can be varied as well to yield an overall system optimization based on the defined cost function.

Direct Global Stiffness Matrix (DGSM) method, which has been formulated to analyze truss-like structures, is applicable to the case of analyzing turbomachinery appendages and shafts. These structures are slender objects, that is, their cross-sectional dimensions are much smaller than their length. The DGSM formulation was designed to analyze assemblages of beam-like structures connected together by "welded" joints, where welded simply means the joint is in force balance and displacements are continuous. A turbomachinery appendage or shaft, even one of varying cross-sectional geometry, can be decomposed into an assemblage of local beam-like structures, each of which has constant cross-sectional properties and pre-stress. In this way, any given appendage or shaft can be modeled by breaking it into a number of beam elements then assembling the elements into a whole, which is an approximation of the actual appendage or shaft. Convergence tests show when the discretization of the structure is sufficiently fine to permit close approximation to the actual dynamics of the structure being designed. The system can also be used in the analysis of plates, that can be represented, for example, by two overlayed orthogonal sets of beams forming a grid, and can similarly be used in the analysis of other more complex structures.

Other forward models can be used instead of DGSM including statistical energy analysis (SEA), finite element analysis (FEA), and boundary element analysis (BEA). These methods are known by those skilled in the art and can be used in the design of damping systems as described herein.

Once the discrete approximation of the appendage or shaft is complete, the iterative design procedure begins. Using the cost function as a guide, design parameters are varied in each beam element according to the optimization procedure being used (deterministic or stochastic). If there are N design parameters defining the cost function, then the objective of the optimization procedure is to find the minimum of the cost function in the N-dimensional space. If N is small, say less than 10, then deterministic methods work well. If N is large, say greater than 100, then stochastic methods work better. If N is between 10 and 100, then the preferred optimization method is a function of the complexity of the functional relationship of the cost function to the N design parameters. The more complicated the function, the more likely that deterministic methods are less accurate and that stochastic methods are used.

The present invention provides effective damping without changing the functional form factor (shape) of the machinery. This damping is light weight with a specific gravity less than 1.5 and does not significantly increase requirements for static load capacity of the machinery. The treatment can be retrofitted to existing machinery. Low-density granular fill is effective because of its low sound speed, which is a property of the selected granular materials.

The present invention can be applied to many types of turbomachinery appendages, including gas turbine blades and vanes, pump impellers, fan blades, marine and aviation propellers, helicopter blades and aircraft wings, wind turbine blades, and steam and hydraulic turbine blades, among others. The damping materials described herein can also be applied to structures that are mechanically coupled to the above systems or systems coupled through air, water or other fluids. Thus, the housing or other support structures for turbomachinery, for example, can also be damped in accordance with the invention.

BRIEF DESCRIPTION OF DRAWINGS

FIGS. 5A and 5B are schematic drawings showing beam geometry from the side and end views, respectively, for defining the local and global coordinate systems.

FIG. 6 is a schematic drawing of a 2-D truss.

FIG. 7 is a schematic drawing of a joint, mass and spring model.

DETAILED DESCRIPTION OF THE PREFERRED EMBODIMENTS

Figure 1:
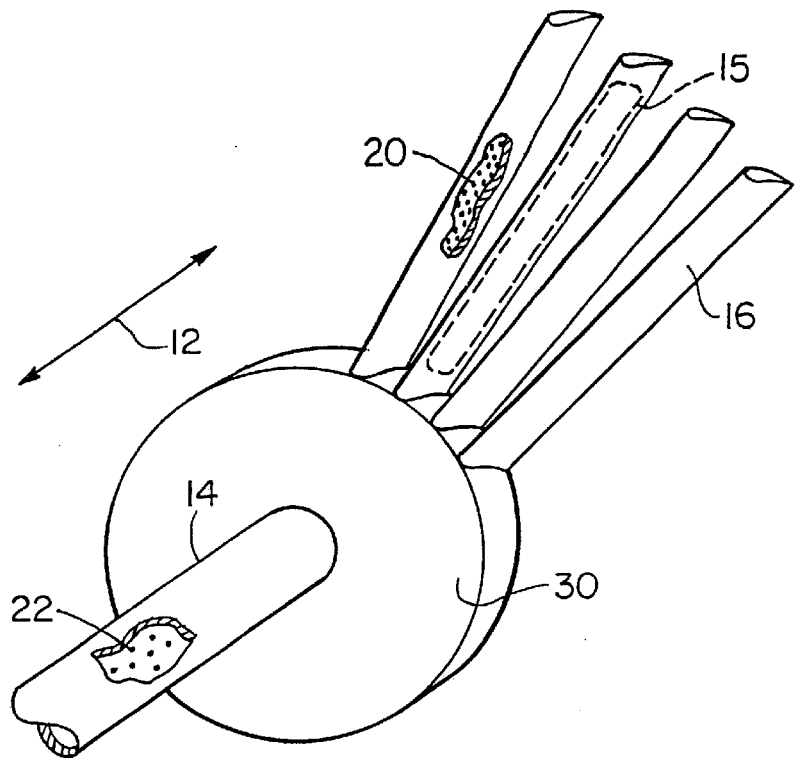
FIG. 1 is a schematic drawing of a turbine wheel with blades, hub, shaft, and low-density granular fill.

Referring to a preferred embodiment illustrated in FIG. 1, hollow turbine blades 16 are shown with low-density granular fill 20 for the passive control of structural vibration. Blades 16 are mounted radially on the rotor hub 30, which is connected to the power transmission shaft 14. A fluid such as air or water is moving relative to the turbine system, such as along axis 12, in either direction parallel to the shaft 12. Alternatively, the fluid flow can be in any desired direction, or can be non-laminar or highly turbulent.

The fractional fill length of the blade (i.e. the volume of the cavity relative to the volume of the blade) can be anywhere from essentially 0% (i.e., no fill) to essentially 100% (i.e., completely filled). Thus in a preferred embodiment, the cavity volume is substantially filled with damping material regardless of the ratio of the volume of the cavity relative to the volume of the blade. The shaft 14 can likewise be partially or completely filled with low-density granular material 22 to reduce structural vibrations. The blades are closed at the ends to contain the low-density granular fill 20 in most applications.

In some high temperature applications using metal alloy elements, openings in the elements are employed to provide cooling. Alternatively, ceramic blades can be used for high temperature applications. It is preferable in most cases to have the fill material remain stationary relative to the rotator or stator element except for the low amplitude displacements associated with the vibrations being damped.

As an example, for long fan blades in a gas turbine, relative speeds as low as 10 m/s excite the lowest order vibrational modes due to vortex shedding. For higher velocities, vortex shedding frequencies increase and excite the higher order modes of the blades. The resonant excitations must be controlled to prevent catastrophic failures. The type of low density granular fill and its distribution in the blade are preferably chosen during the design stage to minimize resonant vibrations at the operating condition of the engine, which may be sub or supersonic.

Figure 2:
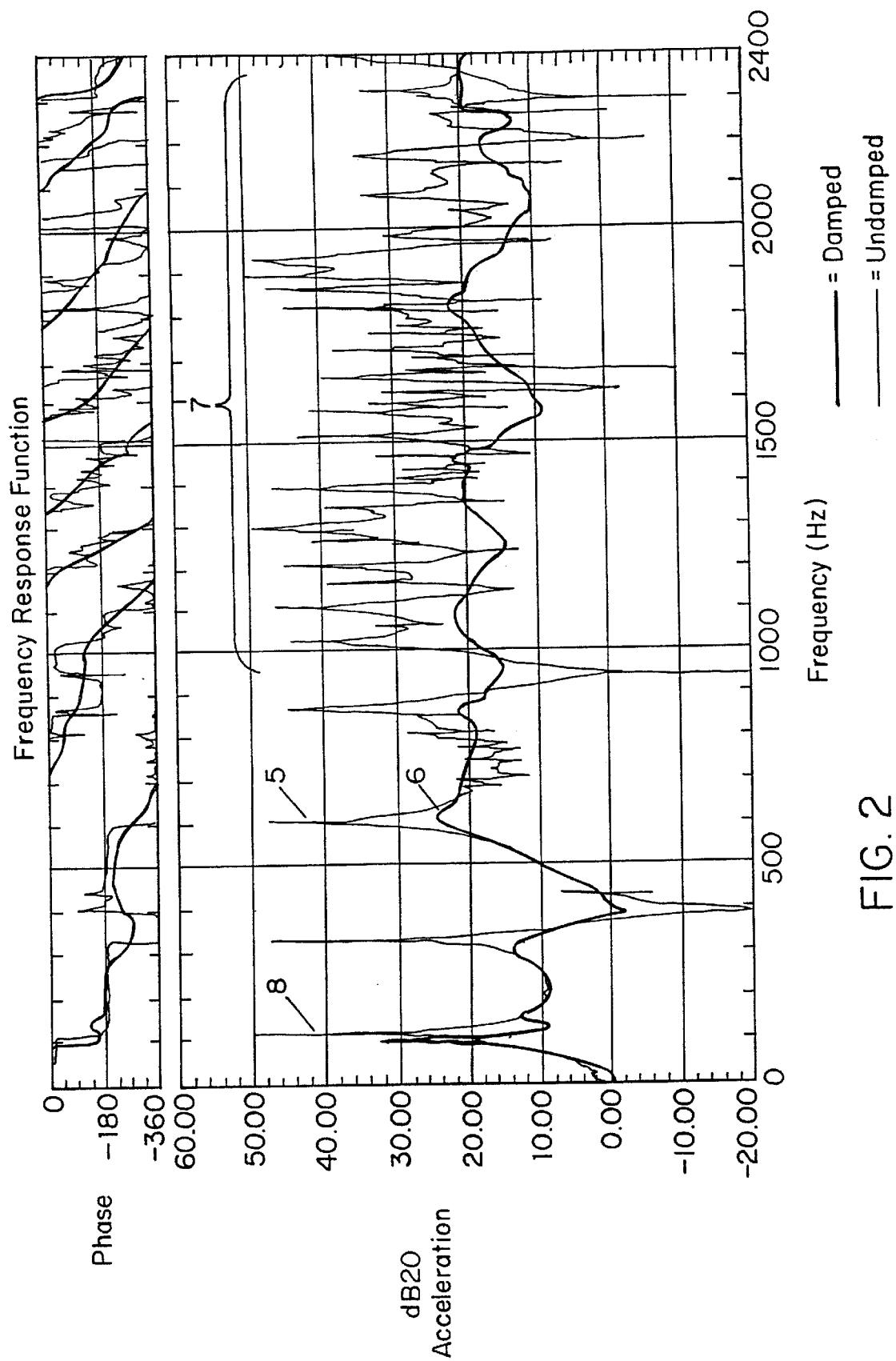
FIG. 2 is a plot of damping effectiveness of low-density granular fill in steel beams.

FIG. 2 depicts transfer accelerance measurements for an undamped 5 and a damped 6 steel box beam that is 4 in.×4 in.×8 ft. long. Damping treatment includes low-density polyethylene beads. Considerable damping occurs in the frequency range of f>200 Hz. Note virtual elimination of cross-sectional beam resonances above 1000 Hz 7. Only a low frequency global bending mode 8 at about 100 Hz survives the low-density granular fill damping treatment and this mode is reduced by about 20 dB.

Figure 3:
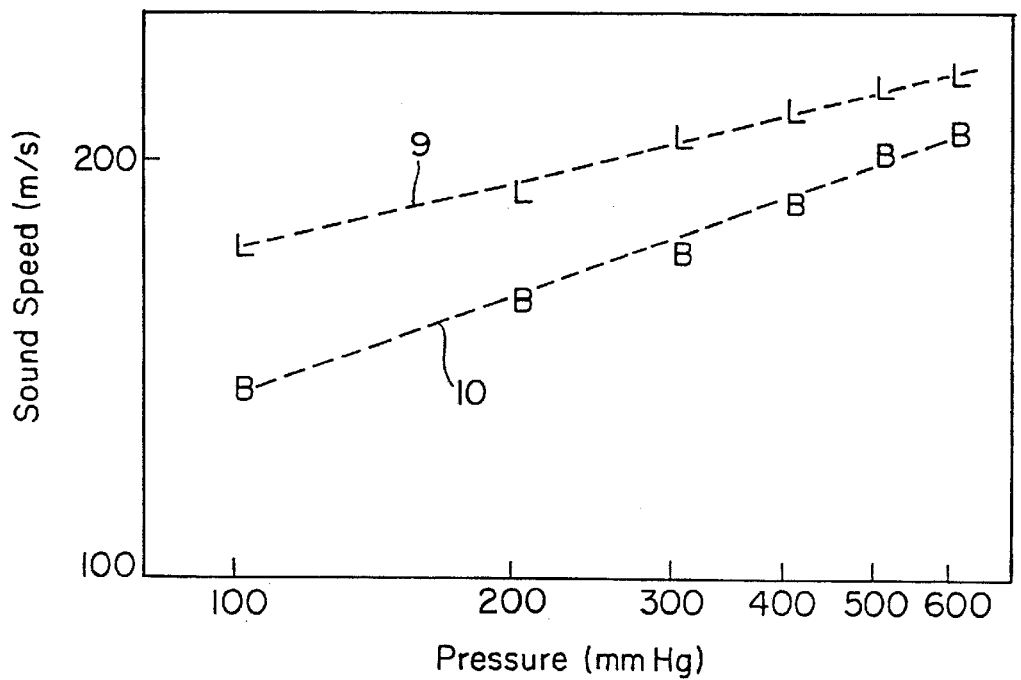
FIG. 3 is a plot of sensitivity of low-density granular fill sound speed to changes in pressure.

FIG. 3 depicts sound speed versus pressure for lead shot (L) 9 and Scotchlite™ glass micro-bubbles (B) 10. The best fit power law for the lead shot is $c\, p^{1/6.07}$, which is very nearly the theoretical power law of $\frac{1}{6}$ power for spherical particles. The best fit power law for the micro-bubbles is a power law of praised to the exponent 1/4.2 and does not fit the theoretical prediction due to the extra compliance of the hollow spheres.

Figure 4:
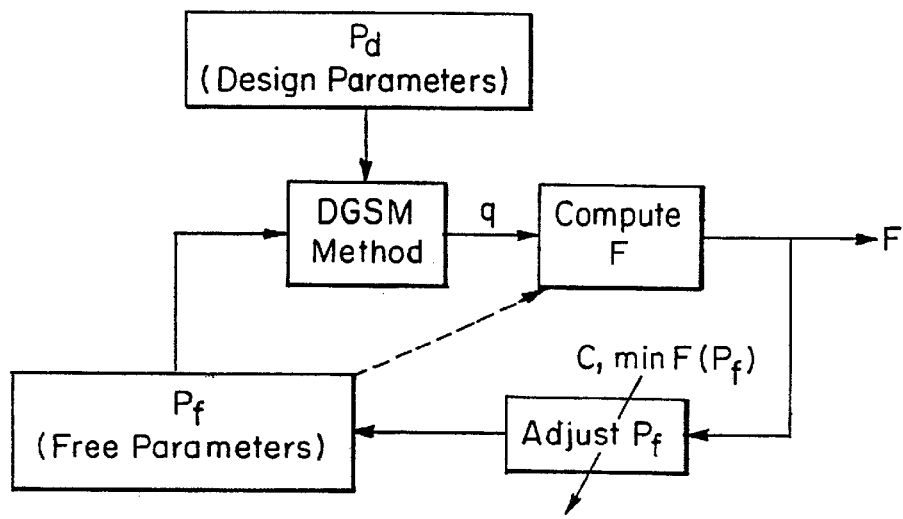
FIG. 4 is a flow chart for the design method based on DGSM modeling for structural dynamics.

FIG. 4 depicts the iterative method for computing the optimal design for a structure damped using low-density granular fill (LDGF). The system design parameters $P_d$, for a system are, for example, the geometrical dimensions and materials, which are fixed for any given design, and are input into the Direct Global Stiffness Matrix (DGSM) system. The system computes a set of system dynamic responses, q, such as $V_{rms}$, force, and energy density, which are used to compute the cost function F, which may also be a function of the free parameters, $P_f$. The cost function is to be minimized over the free parameter space, which are the parameters that can vary for the optimization such as the amount of prestress imposed on the LDGF and the rotating appendage, density, modulus of elasticity and dimensions. The cost function may also be a function of design constraints, C, that are limits on the physical characteristics affecting the system, e.g., beam size must always be greater than some specified lower limit. The minimization procedure is achieved by iterating on the values of the free parameters using an adjustment method based on either deterministic non-linear parameter estimation, e.g., steepest decent gradient searches, or stochastic non-linear parameter estimation, e.g., simulated annealing. The optimization procedure is continued until the minimum cost function F, is found.

The low-density granular fill materials employed in the present invention may be engineered materials for which one has control of size, shape, material properties and composition. For engineered materials, these properties are carefully controlled and customized to meet performance criteria for specific applications. These granular materials are lightweight materials of which polyethylene beads and glass micro-bubbles are just two examples. These engineered granular materials are placed inside structural components either at construction time or poured or inserted at a later time. When the surrounding structure is excited into vibration, the enclosed granular fill material is excited as well. The low-density granular fill materials, employed in the present invention preferably do not have significant mass relative to the host structure, nor do they necessarily have high intrinsic damping as with viscoelastic materials.

The structural damping method and apparatus of the invention offers numerous advantages over the prior art. It is relatively easy to pour the granular material into existing structures if retrofitting is required for remediation of vibration problems. The lightweight nature of the granular material will not cause significant structural loading in most cases. Further, if the damping treatment is considered during the design stages, there is not a significant increment in static load bearing requirements. Hence, only modest changes in the structural design are required with respect to that of a design without treatment.

The damping treatment of the invention can be used with closed beams, e.g., hollow sections, as well as with open beams, e.g., I-beams. In the latter case, only lightweight covering panels are needed to contain the granular treatment in the vicinity of the structural beam member. Since the fill is lightweight, the covering panels do not need to be structural members, i.e., they can be thin membranes such as plastic sheets or films. Suitable lightweight materials for practice of the invention include, but are not limited to, a plastic material such as polyethylene pellets or glass particles such as microspheres or micro-bubbles. For certain applications polyethylene pellets are preferred because of the ease of handling and because of slightly better damping performance with respect to the glass micro-bubbles. For other applications glass micro-bubbles are preferred because they have a bulk specific gravity in the range of approximately 0.05–0.1 which is at least an order of magnitude less than the specific gravity of sand (not less than 1.5) and two orders of magnitude less than that of lead shot (7). Because the treatment technique of the invention does not require high density or material viscoelasticity, the choice of materials is quite broad. Such latitude opens he range of material options to include those that simultaneously offer effective damping as well as other desirable traits such as environmental friendliness, ease of handling, cost, etc. Further, since the fill may be an engineered material, the particle shape, size, and material properties can be tailored to meet specific performance criteria.

For example, for damping frequencies as low as 200 Hz in tubular steel structures with cross-sectional dimensions of about 10 cm, low-density polyethylene (LDPE) beads which have a roughly spherical shape and a particle size ranging between about 1–5 mm in diameter are preferred with about 3 mm in diameter being most preferred. LDPE filled structures with larger cross-sectional dimensions are damped at even lower frequencies. In another example, if light weight is essential, such as in aircraft, glass micro-bubble beads having a spherical shape and a particle size in the range of about 150–300 microns in diameter are preferred with about 177 microns in diameter being most preferred for damping frequencies as low as 300 Hz in tubular aluminum structures with cross-sectional dimensions of about 1 cm. Again, structures with a larger cross-sectional dimensions are damped at lower frequencies.

The damping treatment of the present invention is more effective at lower frequencies than conventional treatments such as constrained layer damping. Thus, for a given level of effort in damping treatment, the low-density granular fill permits attenuation of vibrations at frequencies corresponding to a few bending wavelengths in the structure, which are often troublesome. The frequencies of these low order modes are determined by the structural dimensions and material properties. In many cases, these modes occur at a few hundred Hertz, and it has been shown that LDGF is effective in reducing the resonant dynamics by 10–20 dB at such frequencies.

In all cases, the size of the bead treatment particles must be small enough to be easily accommodated by the structure. The beads should be sized such that the voids containing the beads are at least an order of about ten times the dimension of the bead diameter. For special applications, the beads may be designed for optimum performance. For example, if high temperature tolerance is essential as it is for gas turbines, porous ceramic beads having a roughly spherical shape and a particle size in the range of about 0.1 to 1.0 mm in diameter are preferred with about 0.5 mm in diameter being most preferred. In another example, if low frequency damping is needed in small structures and heat is not a problem, such as with light aircraft propeller blades, then low-density polyethylene (LDPE) beads having a highly irregular, dendritic (needlelike) shape with a nominal diameter of about 2 mm are preferred as they have a lower sound speed. The lowest frequency for which these treatments are effective is dependent on the size of the structure, larger structures being damped to lower frequencies. It has been shown, however, that resonant frequencies down to about 200 Hz are effectively damped using the low-density granular fill treatment of this invention. Damping to lower frequencies depends on the particulars of the structure and treatment design. Damping at frequencies in the range of about 100 Hz–500 Hz can now be accomplished using the present invention without the additional cost and design constraints imposed by constrained layer damping.

The theory on which the present invention is based will now be discussed briefly. The fundamental mechanism that results in damping is that the compressional wave speed in granular materials, C, is much lower than the wave speed in a solid of the same material. With this low wave speed, the wave length, $\lambda$, in the granular matrix is correspondingly low for a given frequency f since $\lambda=c/f$. With a low sound speed, several damping mechanisms, which normally have a small effect, can come into play. These mechanisms include the small intrinsic attenuation within the solid pieces of granular material, the friction between pieces of granular material, and the non-linear hysteresis in the pieces of granular material arising from deformation during the wave propagation process. Together these mechanisms attenuate the vibrations because many wavelengths occupy a physically small space and the attenuation is a strong function of wavelength, shorter ones being attenuated more readily. The present invention does not rely on the mass loading effect as known in the prior art, nor does it rely primarily on the high intrinsic attenuation of bulk viscoelastic polymer materials.

The low-density granular material or the "beads" in the present invention do not necessarily need to be spherical in shape. What is important is that the material be granular so that the bulk wave speed is low. With a low wave or sound speed and hence a small wavelength, any small intrinsic attenuation in the material, non-linear hysteresis due to deformation of the material, or frictional losses between grains of the material will provide effective damping of the structural vibration.

Although originally formulated to analyze truss-like structures, as previously mentioned, the Direct Global Stiffness Matrix (DGSM) method can also be employed to analyze rotating members so that the correct amount and location of low-density granular fill can be determined relative to the members. In order to simplify the explanation, the non-rotating DGSM method is presented first. Once the computation and assembly method is understood, then modification to include rotating members is presented at the end. A discussion of the non-rotating DGSM method now follows.

The fundamental building block for the DGSM method is the beam element in a truss structure. For slender Euler-Bernoulli beams of constant Young's modulus, E, and cross-section, A, the equations of motion for longitudinal, torsional, and flexural motion are well documented. A brief overview of these equations of motion is discussed below with the formulations needed to build the Direct Global Stiffness Matrix system of equations. The beam geometry shown in FIGS. 5A and 5B is used throughout to define the local coordinate system within which the beam displacements, rotations, forces, and moments are referenced.

One dimensional compression waves in a beam are called quasi-longitudinal waves. These waves satisfy the 1-D wave equation $$u_{,tt}=c_L^2 u_{,xx}, \tag{1}$$

where u is particle displacement along the x-axis and $C_L=\sqrt{E/\rho}$ is the longitudinal wave speed. Harmonic solutions to Equation (1) may be written, assuming a temporal dependence of $e^{-i\omega t}$, as $$u=u^+ e^{ik_L x}+u^- e^{-ik_L(x-L)}, \tag{2}$$

where the first term is a right going wave referenced to the left end of the beam at x=0 and the second term is a left going wave referenced to the right end of the beam at X=L and $k_L$ is the longitudinal wavenumber. The stress, $\sigma$, in the beam is computed from the strain as $$\sigma=Eu_{,x}. \tag{3}$$

From this, the total force in the x-direction can be computed as $$f_x=EAu_{,x}, \tag{4}$$

where A is the beam cross-section area.

Using Equation (2) and Equation (4) one may now write a 2×2 system of equations in local coordinates relating the beam amplitudes $u^+$ and $u^-$ to the values of beam displacement, u, and force, $f_x$ as $$\begin{bmatrix} e^{ik_L x} & e^{-ik_L(x-L)} \\ iEAk_L e^{ik_L x} & -iEAk_L e^{-ik_L(x-L)} \end{bmatrix} \cdot \begin{bmatrix} u^+ \\ u^- \end{bmatrix} = \begin{bmatrix} u \\ f_x \end{bmatrix}. \tag{5}$$

In a similar way the torsional waves in a beam may be expressed as motions satisfying the equation $$\phi_{x,tt}=c_T^2 \phi_{x,xx}, \tag{6}$$

where $\phi_x$ is the rotational displacement of the beam about x-axis, the torsional wave speed is $$c_T = \sqrt{\frac{G}{\rho}}, \tag{7}$$

G is the shear modulus of the beam material, and $\rho$ is the material density. Harmonic solutions of Equation (6) may be written in the form $$\phi_x=\phi_x^+ e^{ik_T x}+\phi_x^- e^{-ik_T(x-L)}. \tag{8}$$

The moment or torque on the beam along the x-axis is $$m_x=GJ\phi_{x,x}, \tag{9}$$

where J is the polar moment of inertia.

Using Equation (8) and Equation (9) one may write another 2×2 matrix, this one for the torsional excitation in the beam. Specifically, $$\begin{bmatrix} e^{ik_T x} & e^{-ik_T(x-L)} \\ iGJk_T e^{ik_T x} & -iGJk_T e^{-ik_T(x-L)} \end{bmatrix} \cdot \begin{bmatrix} \phi_x^+ \\ \phi_x^- \end{bmatrix} = \begin{bmatrix} \phi_x \\ m_x \end{bmatrix}. \tag{10}$$

For flexural waves about the y-axis, as defined in FIGS. 5A and 5B, the governing equation of motion is $$\frac{EI_y}{\rho A} w_{,xxxx} = -w_{,tt} \tag{11}$$

where w is the z component of displacement and $I_y$ is the moment of inertia about the y-axis. The flexural wave speed is dispersive. Specifically, the dependence on frequency is expressed as $$C_{B_y} = \sqrt[4]{\frac{I_y}{A}} \sqrt{\omega c_L}. \tag{12}$$

The harmonic solution to Equation (11) may be written as $$w = w^+ e^{ik_{B_y}x} + w^- e^{-ik_{B_y}(x-L)} + w_e^+ e^{k_{B_y}(x-L)} + w_e^- e^{-k_{B_y}x}, \tag{13}$$

where the wave amplitudes we correspond to the evanescent flexural waves in the beam that decay exponentially away from the beam ends. Rotation, bending moments, and shear forces are all related to the wave amplitude w in the z direction as $$\phi_y = -w_{,x}, \tag{14}$$

$$m_y = -EI_y w_{,xx}, \tag{15}$$

and $$f_z = -EI_y w_{,xxx}, \tag{16}$$

Using Equation (13) to Equation (16) produces a 4×4 matrix expressing the flexural excitation on a beam as a function of displacements, rotations, forces, and moments along the beam. In particular, this becomes $$\begin{bmatrix} e^{ik_{B_y}x} & e^{k_{B_y}(x-L)} & e^{-ik_{B_y}(x-L)} & e^{-k_{B_y}x} \\ -ik_{B_y}e^{ik_{B_y}x} & -k_{B_y}e^{k_{B_y}(x-L)} & ik_{B_y}e^{-ik_{B_y}(x-L)} & k_{B_y}e^{-k_{B_y}x} \\ iEI_y k_{b_y}^3 e^{ik_{B_y}x} & -EI_y k_{b_y}^3 e^{k_{B_y}(x-L)} & -iEI_y k_{b_y}^3 e^{-ik_{B_y}(x-L)} & EI_y k_{b_y}^3 e^{-k_{B_y}x} \\ EI_y k_{b_y}^2 e^{ik_{B_y}x} & -EI_y k_{b_y}^2 e^{k_{B_y}(x-L)} & EI_y k_{b_y}^2 e^{-ik_{B_y}(x-L)} & -EI_y k_{b_y}^2 e^{-ik_{B_y}x} \end{bmatrix} \cdot \begin{bmatrix} w^+ \\ w_e^+ \\ w^- \\ w_e^- \end{bmatrix} = \begin{bmatrix} w \\ \phi_y \\ f_z \\ m_y \end{bmatrix} \tag{17}$$

Flexural bending about the z-axis is only sightly different due to the rotation of the local coordinate system and may be expressed in a 4×4 matrix as $$\begin{bmatrix} e^{ik_{B_z}x} & e^{k_{B_z}(x-L)} & e^{-ik_{B_z}(x-L)} & e^{-k_{B_z}x} \\ ik_{B_z}e^{ik_{B_z}x} & k_{B_z}e^{k_{B_z}(x-L)} & -ik_{B_z}e^{-ik_{B_z}(x-L)} & -k_{B_z}e^{-k_{B_z}x} \\ iEI_z k_{b_z}^3 e^{ik_{B_z}x} & -EI_z k_{B_z}^3 e^{k_{B_z}(x-L)} & -iEI_z k_{B_z}^3 e^{-ik_{B_z}(x-L)} & EI_z k_{B_z}^3 e^{-k_{B_z}x} \\ EI_z k_{B_z}^2 e^{ik_{B_z}x} & -EI_z k_{B_z}^2 e^{k_{B_z}(x-L)} & EI_z k_{B_z}^2 e^{-ik_{B_z}(x-L)} & -EI_z k_{B_z}^2 e^{-ik_{B_z}x} \end{bmatrix} \cdot \begin{bmatrix} v^+ \\ v_e^+ \\ v^- \\ v_e^- \end{bmatrix} = \begin{bmatrix} v \\ \phi_z \\ f_y \\ m_z \end{bmatrix}. \tag{18}$$

The next step in developing the Direct Global Stiffness Matrix formulation is to gather equations with displacement and rotation on the right hand side of Equation (5), Equation (10), Equation (17), and Equation (18) into one set and equations with forces and moments into another set. Further, to produce a complete set of equations, the wave amplitudes at both ends of each beam need to be evaluated, i.e., at x=0 and at x=L. Gathering those equations for displacements and rotations into a set yields $$\begin{bmatrix} D^0 \\ D^L \end{bmatrix} \vec{W} = \begin{bmatrix} \vec{U}^0 \\ \vec{U}^L \end{bmatrix} \text{ or } D\vec{W} = \vec{U}, \tag{19}$$

where the wave amplitude vector is defined as $$\vec{W}^T = [u^+, v^+, w^+, \phi_x^+, w_e^+, v_e^+, u^-, v^-, w^-, \phi_x^-, w_e^-, v_e^-], \tag{20}$$

the displacement vector as $$[\vec{U}^{0,L}]^T = [u, v, w, \phi_x, \phi_y, \phi_z]\big|_{x=0,L}, \tag{21}$$

and $D^{O,L}$ are each 6×12 matrices of coefficients, which are complex constants for a given frequency, beam material, and beam geometry. Similarly, the equations with forces and moments on the right hand side can be gathered. These may be written $$\begin{bmatrix} -C^0 \\ C^L \end{bmatrix} \vec{W} = \begin{bmatrix} \vec{F}^0 \\ \vec{F}^L \end{bmatrix} \text{ or } C\vec{W} = \vec{F}, \tag{22}$$

where the force vector is defined as $$[\vec{F}^{0,L}]^T = [f_u, f_y, f_z, m_x, m_y, m_z]\big|_{x=0,L}, \tag{23}$$

Again, the $C^{O,L}$ are each 6×12 matrices of constant complex coefficients. The minus sign leading $C^0$ is required to properly orient the force at the x=0 end of the beam in the local beam coordinates.

Now, using the analogy of a spring relating force to displacement as F=Kx, it is desirable to form a local stiffness matrix relating the beam displacements $\vec{U}$ to the beam forces $\vec{F}$. From Equation (19) we have $\vec{W}=D^{-1}\vec{U}$ and using this in Equation (22) yields $$CD^{-1}\vec{U} \equiv K\vec{U} = \vec{F}, \quad (24)$$

where K is a block stiffness matrix of the form $$K = \begin{bmatrix} K^{00} & K^{0L} \\ K^{0L} & K^{LL} \end{bmatrix}, \quad (25)$$

which explicitly relates the displacement vectors $\vec{U}^o$ and $\vec{U}^L$ to the force vectors $\vec{F}^0$ and $\vec{F}^L$. The off-diagonal block elements are equal due to reciprocity.

Up to this point, the above discussion has been dealing only locally with a single beam element in its local coordinate system (with the x-axis collinear with the length of the beam). In a real truss, many beams are assembled into the overall truss structure. Each beam in the final configuration is, in general, translated and rotated from the origin of the global coordinate system. To account for this change from local to global coordinate systems one must construct a transformation matrix for each beam member. Referring to FIGS. 5A and 5B again, three global coordinates $\vec{g}_1, \vec{g}_2, \vec{g}_3$ are positioned in the local coordinate system. To compute the components of the transformation matrix observe that the unit vector along the local x-axis may be written in terms of the global coordinates as $$\vec{x} = \frac{(\vec{g}_2 - \vec{g}_1)}{|(\vec{g}_2 - \vec{g}_1)|}. \quad (26)$$

The z-axis unit vector may be derived by using the properties of the cross-product as $$\vec{z} = \frac{(\vec{g}_2 - \vec{g}_1) \times (\vec{g}_3 - \vec{g}_1)}{|(\vec{g}_2 - \vec{g}_1) \times (\vec{g}_3 - \vec{g}_1)|}. \quad (27)$$

The y-axis follows from the right-hand rule given $\vec{x}$ and $\vec{z}$. Now, the transformation matrix from local coordinates to global coordinates may be written as $$T = [\vec{x} \; \vec{y} \; \vec{z}], \quad (28)$$

where $\vec{x}$, $\vec{y}$, and $\vec{z}$ are column vectors of the local unit vectors expressed in terms of the global coordinate system.

Now, a coordinate transformation matrix for the 12×1 vectors $\vec{U}$ and $\vec{F}$ is built as $$\underline{T} = \begin{bmatrix} T & O \\ O & T \end{bmatrix}. \quad (29)$$

Applying the coordinate transformation to Equation (19) and Equation (22) and thence to Equation (24) yields the stiffness matrix $$[\underline{T}CD^{-1} \; \underline{T}^T]\underline{T}\vec{U} = \underline{T}\vec{F}, \quad (30)$$

where the matrix in the brackets is the stiffness matrix for an arbitrary beam element expressed in the global coordinate system. Defining new variables for the displacements and forces in global coordinates as $$\vec{\Pi} = \underline{T}\vec{U} \quad \text{and} \quad \vec{\mathcal{F}} = \underline{T}\vec{F}, \quad (31)$$

the stiffness formulation for the $i^{th}$ beam is written as $$K_j \vec{\Pi}_i = \vec{\mathcal{F}}_i, \quad (32)$$

where $$K_i = \underline{T}_i C_i D_i^{-1} \underline{T}_i^T. \quad (33)$$

There are welded boundary conditions at the joints, but as will later be discussed, the joints are permitted to be lossy by attaching an external mass-spring-dashpot system. The welded boundary condition imposes two constraints, one on the displacements and one on the forces. The displacement constraint is that all beam ends terminating at a joint must share the same displacement. This condition may be expressed mathematically as $$\vec{\Pi}_i - \vec{\Pi}_{i+1} = 0 \quad \text{for} \quad i = 1, 2, \ldots, M^j - 1, \quad (34)$$

where $M^j$ is the number of beams terminating at joint j. The other condition that is enforced by a welded joint is one of dynamic equilibrium. Specifically, there must be a net force and moment balance at the joint. The mathematical statement of this condition may be written $$\sum_{i=1}^{M^j} \vec{\mathcal{F}}_i = \vec{\mathcal{F}}_{ext}^j, \quad (35)$$

where $\vec{\mathfrak{I}}_{ext}^j$ is the applied external force to the $j^{th}$ joint in the truss.

The conditions specified in Equation (34) and Equation (35) are enforced implicitly by summing the stiffness from all the beams terminating at each joint. To illustrate, consider a joint at which two beams terminate. The force contribution of the first beam is $\mathfrak{I}_1 = K_1 \, \Pi_1$, where $\Pi_1$ is the joint displacement. Similarly, the force contribution of the second beam is $\mathfrak{I}_2 = K_2 \, \Pi_2$. If the joint displacements for all beam ends are equal $\Pi_1 = \Pi_2 = \Pi$, then summing the forces to satisfy Equation (35) is accomplished equally well by summing the beam stiffnesses, $K_j$. Using this approach for satisfying the welded boundary conditions, let us proceed to construct the global stiffness matrix.

The assembly of the global stiffness matrix closely follows the assembly of finite element static stiffness matrices. All the joints of the truss must be numbered and the beams terminating at each joint must be identified. After this is done, the contributions to the global stiffness matrix due to each beam at each joint must be determined. It is illustrative to see the global matrix constructed using a concrete example. Consider the simple 2-D truss shown in FIG. 6. The stiffness matrix for each beam relates the displacements and forces of the two joints at either end. In particular, say for beam $B_1$, the stiffness matrix may be written $$K_{,1} = \begin{bmatrix} K_{,1}^{11} & K_{,1}^{12} \\ K_{,1}^{12} & K_{,1}^{22} \end{bmatrix}, \quad (36)$$

where the superscripts on the block matrices, $K_1^{jj}$, denote the joint number $G^j$, on either end of the numbered beam, $B_i$, designated by the subscripts on $K$. Using the stiffness matrix for each beam, then, and also using the summation of stiffness at each joint to implicitly satisfy the welded joint boundary condition, a global stiffness matrix for the 2-D truss shown in FIG. 6 may be written as follows:

$$K_{,1} = \begin{bmatrix} K_{,1}^{11}+K_{,3}^{11} & K_{,1}^{12} & K_{,3}^{13} \\ K_{,1}^{21} & K_{,1}^{22}+K_{,2}^{22} & K_{,2}^{23} \\ K_{,3}^{31} & K_{,2}^{32} & K_{,2}^{33}+K_{,3}^{33} \end{bmatrix}. \quad (37)$$

This global stiffness matrix then is used to relate the externally applied forces and moments, $\vec{\mathcal{F}}_{ext}$, to the unknown joint displacements and rotations $\vec{\Pi}$.

One final step is needed in the construction of the stiffness matrix. Loss in the truss joints can be modeled by considering a simple joint mass and spring model as shown in FIG. 7. Associated with the six degrees of freedom in a joint are six masses and springs. To realize loss in the joint, the spring stiffness in the desired degree of freedom is made complex: this applies to the beam, also. For each joint, there is a stiffness vector and a mass vector as follows:

$$k^T = [k_x, k_y, k_z, k_{\phi_x}, k_{\phi_y}, k_{100_z}], \quad (38)$$

and $$m^T = [m_x, m_y, m_z, m_{\phi_x}, m_{\phi_y}, m_{\phi_z}]. \quad (39)$$

The extra (complex) stiffness at the joint due to the mass-spring system may be written in each degree of freedom as $$K_{,d} = k_d - \omega^2 m_d, \quad (40)$$

and the subscript d denotes the particular degree of freedom under consideration. Assembling these individual stiffnesses into a local stiffness matrix for each joint, one may then add this joint stiffness to the appropriate diagonal element of the global stiffness matrix like the one shown in Equation (37). Again, adding the stiffness guarantees the welded joint boundary condition of equal displacements and a balance of forces.

It can be shown that the stiffness matrix $K$, is symmetric positive-definite, which guarantees that no pivoting is required when solving the system $$K\vec{\Pi} = \vec{\mathcal{F}}_{ext}. \quad (41)$$

Further, in most cases the stiffness matrix $K$, will be quite sparse, since most beams and joints are not nearest neighbors, as is the case for the sample 2-D truss configuration in FIG. 6. Thus, fast sparse matrix solvers may be used to efficiently compute the beam displacements and rotations.

Another point worth considering is that once the system has been solved, in particular, once the inverse stiffness matrix $K$ is computed, it is effectively a harmonic Green's function for the truss. The truss response to any given external forcing at the joints may be computed by a matrix multiplication and a weighted superposition of the resulting joint displacement vectors. Thus, using this formulation, one incurs an up-front cost in inverting the stiffness matrix, but afterward, the cost of solving for different forcing arrangements on the truss is trivial. The combination of sparse matrix solvers, guaranteed non-pivoting inversion, and the Green's function nature of the inverted stiffness matrix provide an extremely efficient method for studying truss dynamics. For time dependent solutions spectral superposition of the different harmonic solutions may be accomplished through Fourier synthesis.

Figure 8:
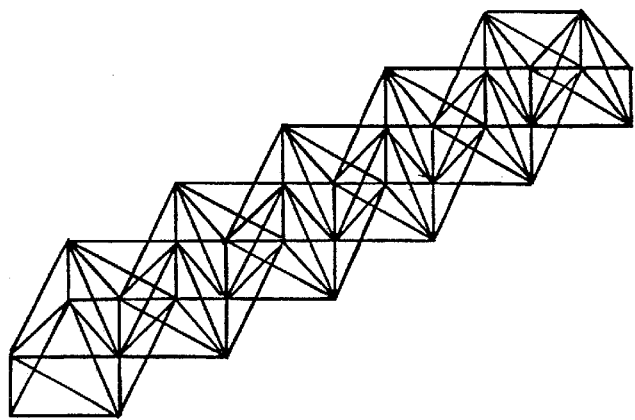
FIG. 8 is a schematic drawing of a 3-D truss.

The Direct Global Stiffness Matrix method has been used to analyze the dynamics of a 3-D truss, which is shown in FIG. 8.

The structure is made of 6061 T6 aluminum tubing struts with an outside diameter of 1.27 cm and a wall thickness of 0.165 cm. The material density is 2700 kg/M$^3$ and the Young's modulus is $6.89 \times 10^{10}$ N/M$^2$. There are 109 struts of three different lengths (48.4 cm, 70.0 cm, and 81.0 cm). There are 35 joints, which are machined from 6061 T6 aluminum bar-stock. The outside diameter of the joints is 6.35 cm and the average mass of the joints is 0.12 kg.

The design described above has no "direct" paths between joints farther than one bay away. Two of the DGSM simulation cases described below make use of loss factors estimated from measurements on the actual truss.

There are three generic locations that passive damping treatment may be added to a truss structure: in the beam members, in the joints, and as dynamic absorbers attached to the beams. Five cases dealing with damping in the beam members and in the joints with varying degrees and placement of damping are considered and are summarized in Table 1.

TABLE 1

FIVE SIMULATION CASES

| Case # | Joint η | Beam η | Comment |
|---|---|---|---|
| 1 | 0 | 0.0001 | Control case |
| 2 | 0 | 0.001 | Experimentally derived value |
| 3 | 0.001 | 0.0001 | Experimentally derived value |
| 4 | 0 | 0.05 | Typical achievable value |
| 5 | 0.05 | 0.0001 | Typical achievable value |

The relative performance of each of these damping treatments is evaluated to provide a guide to the design of an actual full-scale truss structure. To help in the evaluation, we have developed a performance metric based on a combination of analytical quantities and engineering considerations.

The analytical quantities are energy stored, $\mathcal{E}$, and power lost to damping, $p_d$, in the truss. Physically one may think of these quantities in terms of defining a time-constant for the truss structure. Suppose a continuous signal had been applied to the truss for a long time with all initial transients having settled out. There will be some kinetic energy stored in the truss dynamics and some potential energy stored in the truss elasticity. Naturally at any given time and place, these will be different, but globally over the whole truss the kinetic and potential energy will sum to be the total stored energy.

At the same time, the truss is drawing power from the driving source and delivering this power either to heat, through absorption mechanisms in the truss itself, or to radiation loss into the air surrounding the truss. This power must be exactly balanced by the power delivered by the source for a steady state condition. If the source were suddenly turned off, the stored energy in the truss would bleed out of the system via the dissipation mechanisms. The rate at which the diminution of stored energy occurs is exactly the energy decay rate of the truss system and may be represented mathematically as $$D_\omega = \frac{p_d}{\mathcal{E}_s}, \quad (42)$$

which is the narrowband energy decay rate for a given frequency. If there is a great deal of damping relative to the level of stored energy, then the decay rate will be quite high. Similarly, low damping gives a small decay rate. Before the decay rate is used as part of the performance metric, however, it must be integrated over the band of frequencies of interest. Thus, the broadband energy decay rate is defined as $$D = \int_{\omega_1}^{\omega_2} D_\omega \, d\omega \quad (43)$$

and implicitly includes the effects of frequency dependent loss.

To compute the dissipated power in the truss, the steady-state input power at each of the drive-points is computed. This may be computed as the time averaged product of the applied force at the drive-point and the associated joint velocity. The RMS power may then be written compactly as $$p_d = \frac{\omega}{2} \sum_k \mathcal{R}\left[\mathcal{F}_{ext,k} \Pi_k^*\right]_{@drive-point\,k}, \quad (44)$$

where $\mathcal{R}[.]$ denotes the real part, the term $\omega$ derives from the conversion of displacement, $\Pi$, to velocity for harmonic systems, and finally, the sum over k accounts for excitation at many drive-points.

The total potential and kinetic energy stored in the $i^{th}$ beam, $\mathcal{E}$, is computed using the wave amplitudes, $W^T$, which in turn are computed from the joint displacements using Equation (19). The potential and kinetic energy stored in each point $\mathcal{E}_s^j$, is computed using lumped parameter equations for the mass-spring-dashpot systems.

Now, the total stored energy in the truss may be computed as $$\mathcal{E}_s = \sum_i \mathcal{E}_{s,i} + \sum_j \mathcal{E}_s^j. \quad (45)$$

With the narrowband decay rate $D$, as computed in Equation (42), we then integrate over frequency to derive the broadband decay rate.

The energy decay rate, however, is not sufficient to act as a performance metric on its own. We know a priori that large decay rates may be achieved by simply increasing the loss factor $\eta$. What is not included in the metric is a measure of the engineering cost for a given damping treatment. Specifically, a weight penalty and a penalty for engineering difficulty can be considered. Although these are not analytical quantities, they must be included in the performance metric in some way. For purposes of this analysis, the penalties are incorporated as factors on a scale from 1 to 5, with 1 being "good" in a normalized sense and 5 being "bad". Table 2 shows the penalties proposed for each of the damping treatments, including the dynamic absorbers, even though they are not included in the analysis here. It is felt that the dynamic absorbers are sufficiently well known that by including them in the table, a sense of perspective is provided on the penalty values selected for the beam and joint treatments.

TABLE 2

PENALTIES FOR DAMPING TREATMENT

| Factor | Beam | Joint | Dyn. Abs. |
|---|---|---|---|
| Weight,$\Pi$ | 2 | 1 | 5 |
| Eng. Diff.,B | 1 | 5 | 3 |

TABLE 3

BROADBAND DECAY RATE FOR FIVE CASES

| Case # | $p_d$ (W/N) | $\mathcal{E}_s$(J/N) | $D(s^{-1})$ |
|---|---|---|---|
| 1 | $3.8 \times 10^6$ | $8.1 \times 10^7$ | .05 |
| 2 | $5.3 \times 10^6$ | $9.8 \times 10^5$ | 5.4 |
| 3 | $4.3 \times 10^6$ | $8.3 \times 10^7$ | .05 |
| 4 | $4.3 \times 10^6$ | $1.5 \times 10^4$ | 287 |
| 5 | $7.4 \times 10^6$ | $1.3 \times 10^8$ | .06 |

From these penalties and the decay rate, an overall performance metric of goodness can be computed as $$G = \frac{D}{\Pi B}, \quad (46)$$

where $G$ is the final performance metric.

Figure 9:
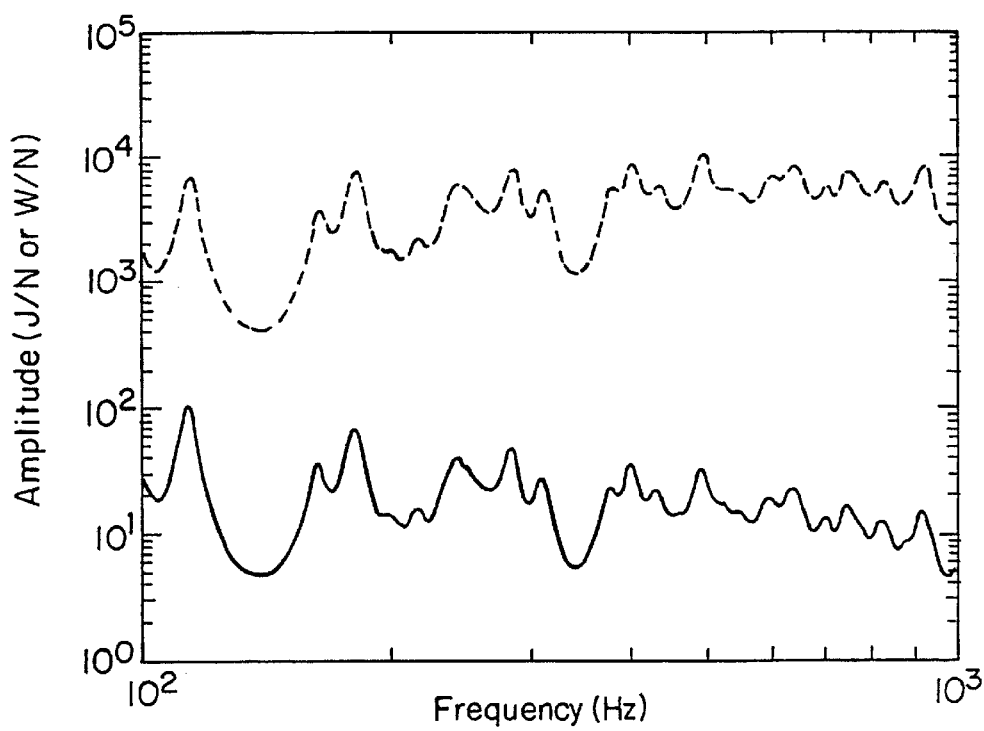
FIG. 9 is a plot depicting stored energy in truss and total dissipated power.

Simulations for the five cases shown in Table 1 were run with varying amounts of damping in the joints and beams as indicated. For each case, the total stored energy and dissipated power were computed as a function of frequency. An example of the results for the damped beam with $\eta=0.05$, Case 4, is shown in FIG. 9. In this Figure, the total stored energy per unit of input force in the truss is shown as a function of frequency (solid) as is the dissipated power per unit input force (dashed). From these curves, it can be seen that the narrowband energy decay rate is around $10^2$ at low frequency and $10^3$ at high frequency. Integrating these narrowband results over the frequency range of 100–1000 Hz gives a total stored energy of $1.5 \times 10^4$ J/N and a dissipated power of $4.3 \times 10^6$ W/N for a broadband energy decay rate of $287 s^{-1}$. Using this same approach for the other cases, results shown in Table 3 are constructed.

TABLE 4

PERFORMANCE METRIC FOR FIVE CASES

| Case # | $\Pi$ | B | $G$ |
|---|---|---|---|
| 1 | 1 | 1 | .05 |
| 2 | 2 | 1 | 2.7 |
| 3 | 1 | 5 | .01 |
| 4 | 2 | 1 | 144 |
| 5 | 1 | 5 | .012 |

These results suggest that effort should be spent in damping treatment in the beams and not in the joints. The engineering penalty factors are now applied to arrive at a performance metric for each of the cases under consideration. The weight and engineering difficulty factors for the cases and the resulting metric are assumed as shown in Table 4.

For this example, the choice for damping treatment in the truss is in the beams as shown in Case 4. Damping added to the joints is not necessary, even for damping loss factors comparable to that applied to the beams. The physical explanation for this is that the wave energy spends so much more time in the beam that even a small amount of damping there will out perform even modest damping applied to the joints.

The above DGSM approach can simulate the dynamics of arbitrary 3-D truss configurations and has a number of advantages over existing techniques. These advantages include fast solutions for the global displacement of truss joints and the ability to compute the wave amplitudes of the different wave types on each beam. Perhaps the most significant advantage is that the solution to the system of equations is, in fact, a harmonic Green's function, which may be used repeatedly to compute the solution for the truss motion for an arbitrary combination of applied forces and moments to the truss joints. This approach is possible because the dynamics are represented as linear and superposition of elemental forcing solutions is an accurate approximation. Damping performance is quantified, thus permitting the designer to make informed decisions about where and how much damping to use to achieve a given level of performance.

When appendages are rotated about an axis perpendicular to the axis of the appendage, then centrifugal forces combined with the distributed mass of the appendage produce tension along the axis of the appendage. This tension increases the flexural rigidity of the appendage and, thus, increases the resonant frequencies. The complication with rotating appendages, however, is that the tension is not uniform along its length as a result of varying mass, centripetal acceleration, and appendage cross-section. The tension induced by the rotation of the appendage generally increases toward the hub, which is the principal reason that reducing weight in rotating parts is so important.

In the context of this invention, another complicating factor in rotating appendages is that the centrifugal forces produce an apparent hydrostatic pressure on any granular material that is contained within the appendage. Like the tension imposed on the appendage, the pressure seen by the granular material is not uniform along the length of the appendage. Unlike the case for tension, however, the pressure on the granular material increases toward the tip of the rotating appendage. The fact that pressure varies with length along the length of the appendage leads to a variable sound speed of the granular material along the appendage, and hence a variable loss factor, $\eta$. As a result, the loss factor in rotating appendages is a function of rotation speed, $\Omega$, bulk modulus of the granular material, $E_g$, bulk density of the granular material, $\rho_g$, and geometry of the material placement, $\vec{x}_g$.

The design of a low vibration rotating appendage requires that the appendage have high damping at frequencies that can be excited by either mechanical dynamics, e.g., vibrations from imbalance and harmonics, or fluid dynamics, e.g., vortex shedding at the Strouhal frequency matching a structural appendage resonance. A robust design is one that operates free of large vibrational dynamics over a broad range of operating conditions. This requirement must be achieved simultaneously with considerations of weight and cost. A methodology to develop such designs has already been discussed in the context of FIG. 4, and a detailed presentation of the Direct Global Stiffness Matrix (DGSM) method used to represent a dynamic system of beam-like elements has been presented. In the case of rotating members, however, a modification to the DGSM is made. The flexural bending equations are modified to include tension in the beam elements.

Recall Equation (11), which is the classical Euler-Bernoulli bending beam equation. Tension may be added to the beam to form what is called a stiff-string equation. Specifically, $$\frac{EI_y}{\rho A}\frac{\partial^4 w}{\partial x^4} - \frac{T}{\rho A}\frac{\partial^2 w}{\partial x^2} = -\frac{\partial^2 w}{\partial x^2} \tag{47}$$

where T is the tension on the beam element, and all the other variables and parameters are as before. If a harmonic solution is assumed, the equation can be rewritten as $$\frac{\partial^4 w}{\partial x^4} - \underbrace{\frac{T}{EI_y}}_{2\beta^2}\frac{\partial^2 w}{\partial x^2} - \underbrace{\frac{\omega^2 \rho A}{EI_y}}_{\gamma^4} w = 0, \tag{48}$$

where $\beta$ and $\gamma$ are chosen for convenience in calculating the stiff-string wavenumber, $k_s$, as seen next. If a solution of the form $w(x)=Ae^{k_s s}$ is assumed and used in Equation (48) then the dispersion relation may be written $$k_s^4 - 2\beta^2 k_s^2 - \gamma^4 = 0. \tag{49}$$

There are four solutions to Equation (49), namely $$k_s = \pm k_{s_1}, k_{s_1}^2 = \sqrt{\beta^4 + \gamma^4} + \beta^2 \tag{50}$$

and $$k_s = \pm i k_{s_2}, k_{s_2}^2 = \sqrt{\beta^4 + \gamma^4} - \beta^2. \tag{51}$$

With these solutions for the stiff-string wavenumber, the harmonic solution to Equation (47) can be written in a perfect analogy to Equation (13) as $$w = w^+ e^{ik_{s_2}x} + w^- e^{-ik_{s_2}(x-L)} + w_e^+ e^{k_{s_1}(x-L)} + w_e^- e^{-k_{s_1}x}. \tag{52}$$

The difference between the solution as written in Equation (52) and that written in Equation (13) is the fact that the wavenumber is now a function of tension in the beam element. If tension is reduced to zero, then $\beta$ reduces to zero and the stiff-string wavenumber reduces to $$k_s^2 = \gamma^4 = \left[\frac{\omega^2 \rho A}{EI_y}\right]^{1/2}, \tag{53}$$

which leads directly to the bending wave speed as written in Equation (12) for a beam element with no tension.

In the foregoing, then, a beam bending equation has been derived for use in the DGSM method when the beam elements are in tension, which occurs when the beam is subjected to centrifugal forces. The solution, as written in Equation (52), can be used to assemble the global stiffness matrix in the DGSM method. With this equation incorporated into the method, the representation includes physical characteristics that are specific to the rotating appendage problem.

Figure 10:
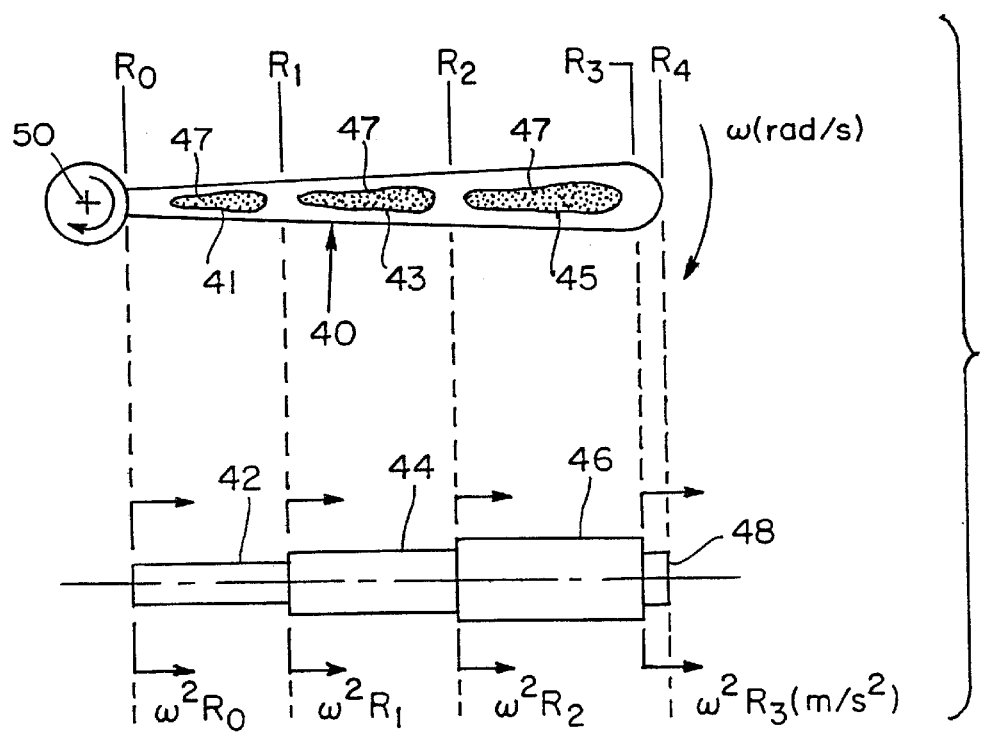
FIG. 10 is a schematic drawing of a propeller blade being modeled as beam elements.

As an example of how the modified version of DGSM is used, consider FIG. 10 where a physical propeller blade or member 40 rotating about a pivot point 50 is represented as an assemblage of four elements 42, 44, 46 and 48. The elements are located between radii $R_0$, $R_1$, $R_2$, $R_3$ and $R_4$. Propeller blade 40 has three cavities 41, 43 and 45 which are located between radiuses $R_0$, $R_1$, $R_2$ and $R_3$. The selection of four elements in FIG. 10 is purely for illustrative purposes, and the actual number of elements are determined by convergence tests on successively finer approximations. Certain salient features are illustrated in FIG. 10. Specifically, the beam elements 42, 44, 46 and 48 do not necessarily have to be of equal length. This freedom is inherited from the non-rotating DGSM representation. The centrifugal forces, and hence tensions, arise from the radial dependence of the centripetal acceleration, $\omega^2 R$, and the spatially distributed mass of the member. The calculation of the tension is done automatically for a given geometry of the elements and a rotation speed, $\omega$.

Damping of the beam member is achieved by the placement of granular material 47 within individual beam elements 42, 44 and 46 by filling cavities 41, 43 and 45 with the granular material 47. The damping loss factor for a given material, rotation speed, and fill geometry is determined by interpolation from a lookup table based on experimental results for that material. In general the damping loss factor can be written as $$\eta = \eta(\sigma_p, E_g, \rho_g, \vec{x_g}), \quad (54)$$

where $\sigma_p$ is the apparent hydrostatic pressure imposed on the granular material due to centrifugal forces, $E_g$ is the bulk Young's modulus of the granular material, $\rho_g$ is the bulk density and $\vec{x}_g$ represents the geometric description of the granular material distribution within the structure. While rotation produces pre-stress in the beam elements, which was described previously, rotation produces an apparent hydrostatic pressure in the granular material, since the material does not support shear, and hence, behaves like a fluid. The hydrostatic pressure is lower near the hub, where centrifugal forces are the lowest, and greater near the tip, where centrifugal forces are the greatest. Although cavities 41, 43 and 45 have been depicted in FIG. 10 to be elongate cavities which are positioned along the longitudinal axis of propeller blade 40, alternatively, cavities 41, 43 and 45 can be positioned perpendicular to the longitudinal axis. In addition, cavities 41, 43 and 45 can be replaced by a single elongate cavity extending along the longitudinal axis of propeller blade 40.

Figure 11:
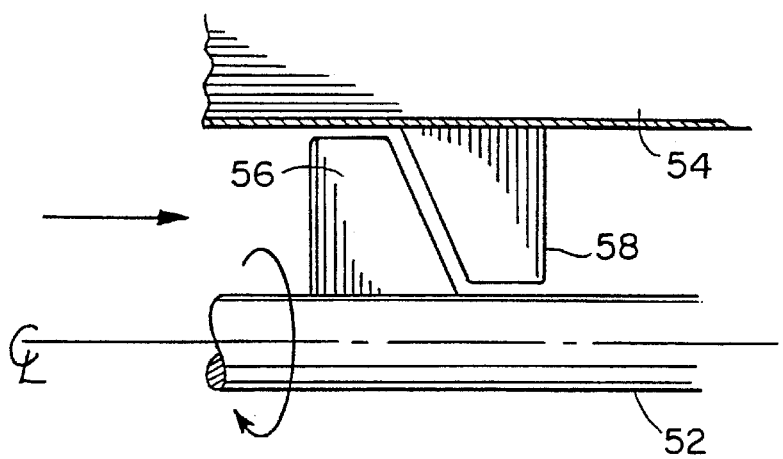
FIG. 11 is a side view of a rotor and stator blade.

The DGSM program can be used for either fixed (non-rotating) or rotating appendages in the design cycle illustrated in FIG. 4. In addition, both fixed and rotating beam elements can be incorporated into a single representation. An example of this is the assemblage illustrated in FIG. 11. The shaft 52, support structure 54 and stator 58 are represented as static elements, since centrifugal forces are not dominant if the whirling of the shaft 52 is ignored. The blades 56 are represented with rotating beam (application of method to plates made up of beams criss crossing) elements as previously discussed.

Figure 12:
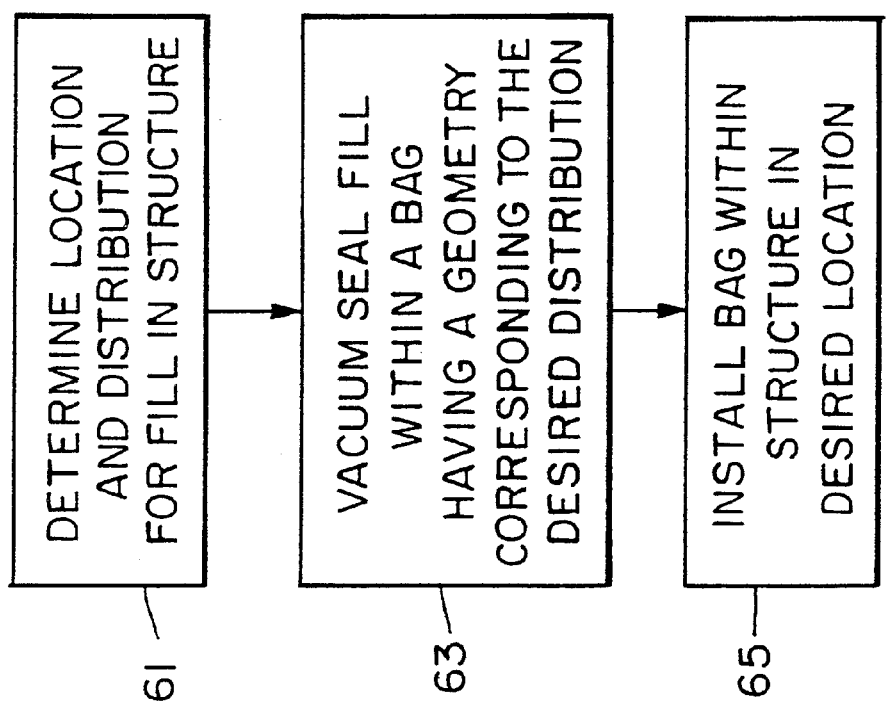
FIG. 12 is a flow chart of a preferred method of installing fill within a structure.

Referring to FIG. 12, a preferred method for installing granular fill within a structure is shown. In step 60, the location for installing the fill is determined in the manner described above. Then, in step 62, a bag (e.g. liner 15 in FIG. 1) or container formed from a polymer, for example, and having a geometry corresponding to the desired distribution for the fill is filled with granular fill, evacuated and sealed. The bag containing the granular fill is then installed within the structure at the desired location in step 64. The container can be rigid or flexible depending upon the needs of a particular application. For systems that are designed for use with the damping system of the present invention, this modular manufacturing technique can improve safety by minimizing exposure to the granular fill and improve efficiency.

Four materials have been identified for use at elevated temperatures: perlite, vermiculite, ceramic beads, and glass microspheres. The density range, approximate sound speed, and approximate maximum operating temperature for each of the materials is shown in Table 5 below.

TABLE 5 material properties for high temperature application

| Material | density range (kg/m³) | appx. sound speed (m/s) | appx. max. Temperature (° C.) |
|---|---|---|---|
| vermiculite | 132 | 90 | 1150 |
| perlite | 32–200 | 62 | 900 |
| glass micro-spheres | 70 | 97 | 400 |
| ceramic spheres | 200–700 | appx. 100 | 1000 |

Vermiculite is an agricultural, construction, and refractory material made by flash heating an ore containing a small percentage of water. The water expands and produces a light weight granular material able to tolerate high temperatures. Preferred processing of vermiculite involves grading particle size to be uniform, and less than 2 mm in diameter preferably in the range of about 1 mm diameter.

Perlite is a volcanic glass or refractory material that is manufactured in a manner much the same as vermiculite. A water bearing ore is flash heated to about 870° C. or more, which causes the water to vaporize and produce a porous, light weight material. Perlite is used in agriculture, construction, and refractory applications and tolerates temperatures up to about 1100° C. Preferred processing for perlite involves milling and grading the particle size to be less than 2 mm, and preferably less than about 1 mm in diameter. The specific gravity of agricultural perlite is about 0.097 with a large particle size distribution. Milling and sifting through a 1.45 mm screen produces a perlite material with a specific gravity of about 0.2. This processing increases the mechanical stability of the material in the presence of applies forces.

Porous ceramic granules can be manufactured as an absorbent for liquids in a variety of applications. The manufacturing process is described in U.S. Pat. No. 5,177, 036 entitled "Ceramic material", the entire contents of which is incorporated herein by reference. The ceramic beads can range in size from 1–5 mm and have a bulk specific gravity of 0.2 to 0.7. The manufacturing process requires that the beads be fired to a temperature of 1100° C., which makes them stable in elevated temperature applications.

Glass microspheres are used because of their light weight and high strength under static pressure. 3M makes this product under the tradename Scotchlite™. While not a refractory material, per say, the micro-spheres are made of glass and are stable at moderately high temperatures of several hundred degrees Fahrenheit. The commercial product made by 3M is available in several different sizes and grades. The glass micro-spheres can be used in their manufactured form, but handling of the material is difficult since it becomes airborne so easily due to its light weight and small particle size. To facilitate handling, processing of the manufactured material involves making a thick paste or slurry of the micro-spheres and a volatile liquid with or without adhesives. After the material is in place, modest heat and/or a vacuum is applied to accelerate volatilization of the liquid, which is driven from the mixture leaving the micro-spheres behind. The temperature at which the component is treated depends on the volatile liquid. Use of water leaves the micro-spheres in a semi-solid cake, even without any adhesives added. The formation of the micro-sphere cake reduces the occurrence of airborne particulates and reduces the nuisance factor if the material is intentionally or accidentally released from the part in which it is placed. For lower temperature applications an alcohol volatile in which trace amounts of shellac were dissolved can be used. When the alcohol is volatilized, the shellac is left behind to enhance surface adhesion between the micro-sphere particles. Other volatile liquids and mild adhesives can be used for specific applications.

Figure 13A:
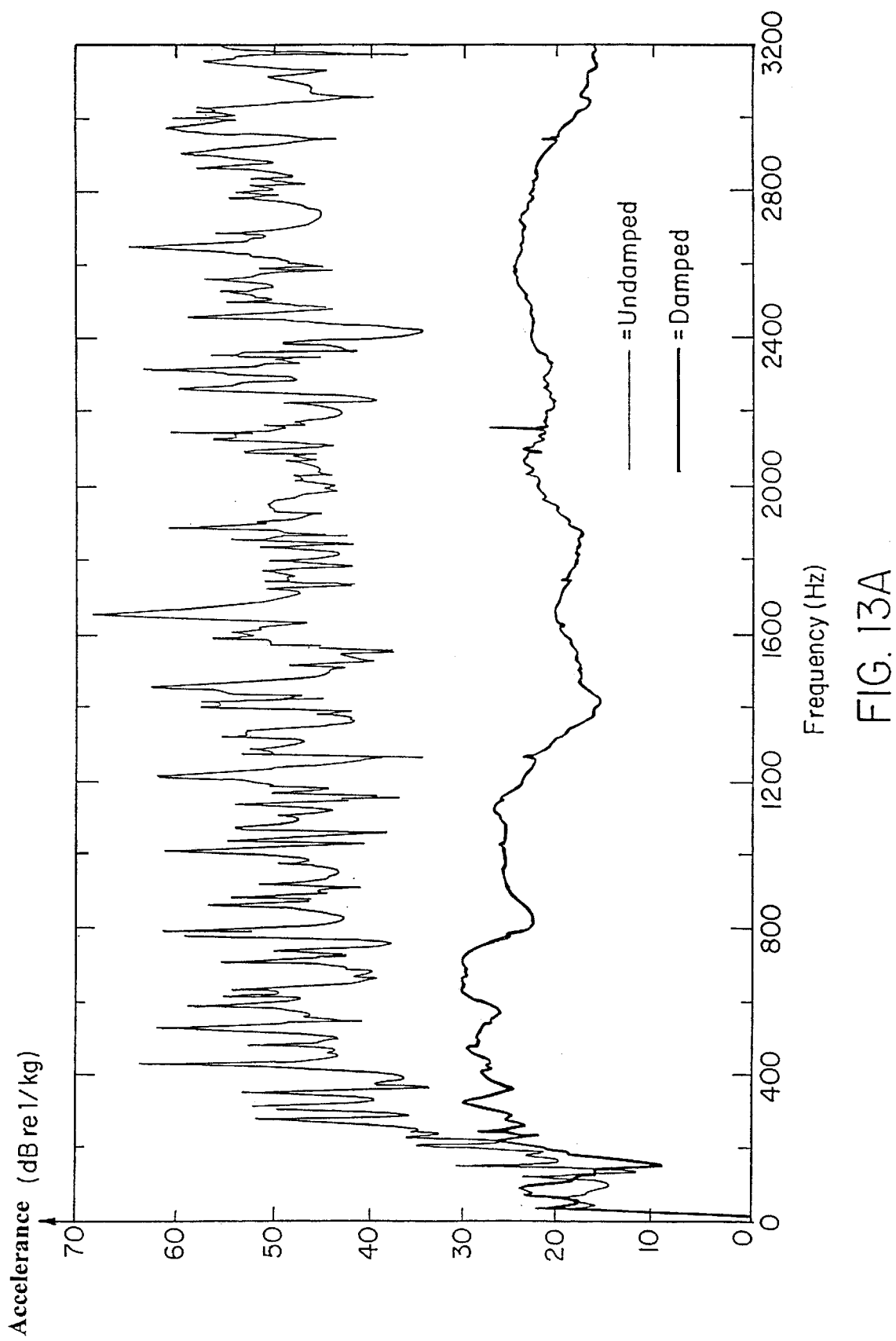
FIGS. 13A and 13B are plots illustrating the damping characteristics of plates and beams, respectively, in accordance with the invention.

An experiment using low-density polyethylene (LDPE) beads in contact with an aluminum plate produced the results shown in the attached FIG. 13A. The plate was 10½"×15½" and 1 mm thick. Three transfer accelerance measurements were averaged to produce an average response for the plate with and without low-density granular fill (LDGF) damping. For the undamped case the plate was left bare. For the damped case, a pocket made of shrink wrap material was formed on one side of the plate and filled with LDPE beads. The top of the pocket was sealed with tape and the shrink wrap was heated, causing it to shrink and force the LDPE beads against the side of the plate. The transfer accelerance measurements were repeated and the average was computed. FIG. 13A shows the results of the two experiments with the light line representing the undamped plate response and the heavy line representing the damped response. The transfer accelerance of the plate is reduced by up to 30 dB when the plate is damped.

Figure 13B:
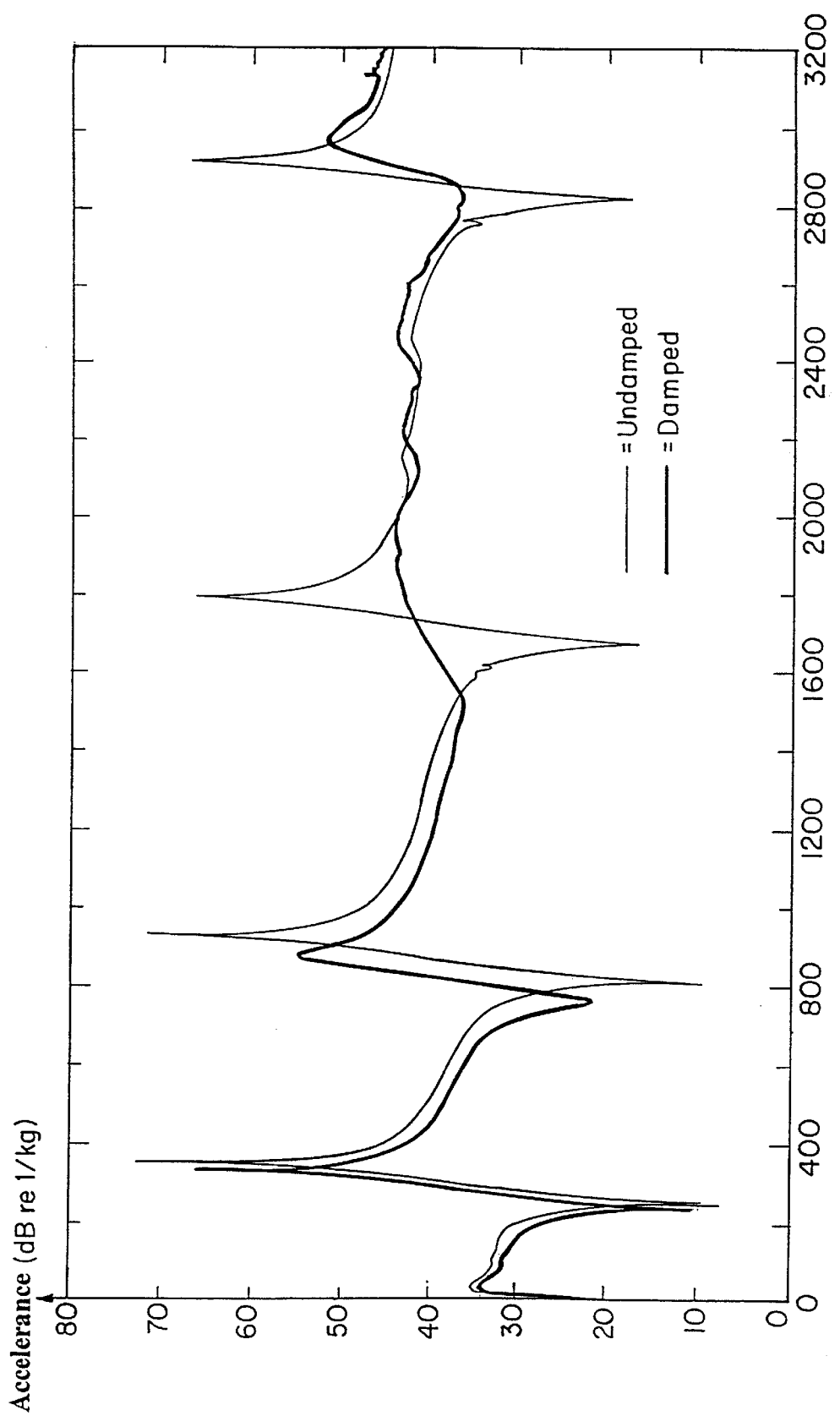

In FIG. 13B, the drive point accelerance response of a tubular aluminum beam is shown with and without damping. The beam has an O.D. of 12.7 mm and an I.D. of 9.3 mm and is 0.46 m long. It is suspended using elastic bands with a suspension frequency of about 7 Hz, which simulates a free beam response. Drive point accelerance was measured at one end of the empty beam and the result is shown as the light line in FIG. 13B. The beam was filled with milled and screened perlite and the drive point accelerance measurement repeated. The heavy line in FIG. 13B shows the result. The resonant peaks of the undamped system are reduced by up to 15 dB relative to those of the undamped response.

Figure 14:
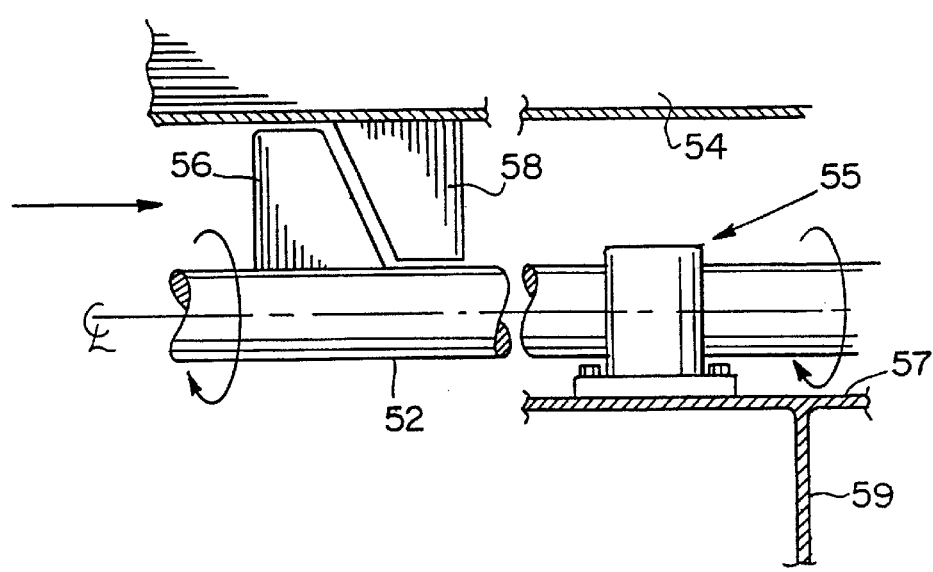
FIG. 14 is a side view of a damped support structure for a damped rotor assembly.

When structures are coupled either directly or indirectly to other structures directly excited into vibration by fluid flow or rotating turbomachinery the coupled structures are similarly excited into vibration. Many such structures can be modeled as beams or plates. The results in FIGS. 13A and 13B show the effects of the use of LDGF damping on such structures. LDGF treatment of the vibrating component results in a dramatic reduction of the vibrating levels. An example of such a structure is shown in FIG. 14 where the rotating shaft 52, or a plurality of rotating elements, of a piece of turbomachinery is coupled to a base structure or housing 57 through a bearing assembly 55 and possibly through direct excitation from the fluid flow. The base structure 57 is, in turn, coupled to other structures such as support beams 59, which are themselves set into vibration. The vibration level of any given component is ultimately driven from rotating machinery or fluid flow even though neither force is acting directly on the component. In many cases, however, it is important to reduce the vibration levels of such remote components, and use of LDGF is effective to this end.

Structures coupled to fluid and mechanical sources of power are excited into vibration, which, in turn, result in the radiation of sound into any surrounding fluid medium. The medium in many cases is either air or water. The input power, $P_I$, must be exactly balanced by the power lost to damping in the structure, $P_D$, plus the acoustic power radiated into the surrounding fluid, $P_R$. Specifically, $$P_I = P_D + P_R. \tag{55}$$

The power dissipated in the structure, $P_D$, may be written as a function of the structural loss factor, $\eta_D$, as $$P_D = \omega \eta_D m'' S \langle v^2 \rangle, \tag{56}$$

where $\omega$ is frequency in radians per second, m" is the mass per unit area, S is the surface and $\langle v^2 \rangle$ is the mean-square velocity of the structure. In a similar way, the radiated power, $\eta_R$, may be written as $$P_R = \omega \eta_R m'' S \langle v^2 \rangle, \tag{57}$$

where $\eta_R$ is the radiation loss factor defined as $$\eta_R = \frac{\rho c \sigma}{\omega m''}, \tag{58}$$

and where σ is the radiation efficiency of the structure (which depends on frequency, structure size, and structure type, e.g., plate, shell, or beam). Using Equation (56) and Equation (57) in Equation (55) yields $$P_I = \omega(\eta_D + \eta_R) m'' S \langle v^2 \rangle. \tag{59}$$

For a given input power, which is essentially independent of any structural or radiation damping, an increase in the structural loss factor, $\eta_D$, must be offset by a reduction in the mean-square velocity, $\langle v^2 \rangle$. With a reduction in mean-square velocity, the radiated acoustic power $P_R$, will reduce by virtue of Equation (57).

Low-density granular fill (LDGF) damping treatments are specifically designed to increase the structural loss factor, $\eta_D$. Experiments have shown that increases by an order of magnitude or more are not uncommon as shown in FIG. 13A and FIG. 13B.

Further insight can be developed by combining Equation (59) and Equation (57) to produce a single equation relating total available input power, $P_I$, and the radiated acoustic power, $P_R$;

$$P_R = \frac{P_I}{1 + \eta_D / \eta_R}. \tag{60}$$

This result shows that the ratio of the structural loss factor to the radiation loss factor governs the conversion of input to radiated power and suggests the investigation of two asymtotic, but practical, cases, i.e., light fluid loading and heavy fluid loading.

For the case of light fluid loading, which is exemplified by airborne sound, the radiation loss factor, $\eta_R$, is always less than the structural loss factor, $\eta_D$, and usually much less. Thus, for airborne sound the radiated acoustic power can be approximated by $$P_R = \frac{P_I \eta_R}{\eta_D}, \quad (61)$$

which shows that an increase in structural damping results in a reduction of radiated acoustic power.

For the case of heavy fluid loading, as exemplified by water-borne sound, the radiation loss factor, $\eta_R$, is often greater than the structural loss factor, $\eta_D$, which leads to no simplification of Equation (60). Nevertheless, even in this case, it is seen that an increase in structural damping results in a decrease of radiated acoustic power, though not as dramatic as for the light fluid loading case.

Figure 15A:
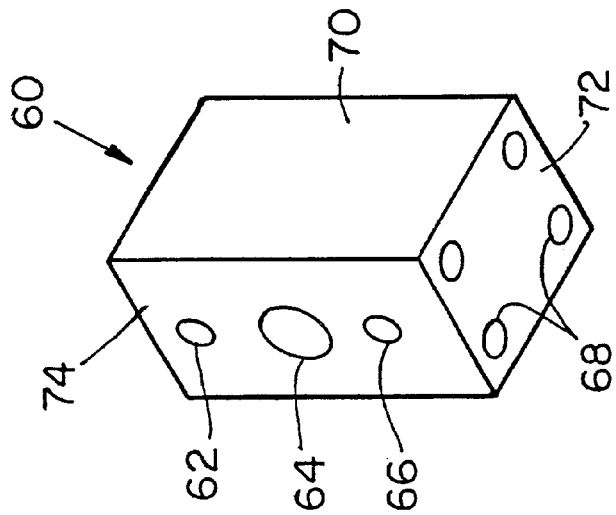
FIG. 15A is a perspective view of a damped housing in accordance with the invention.
Figure 15B:
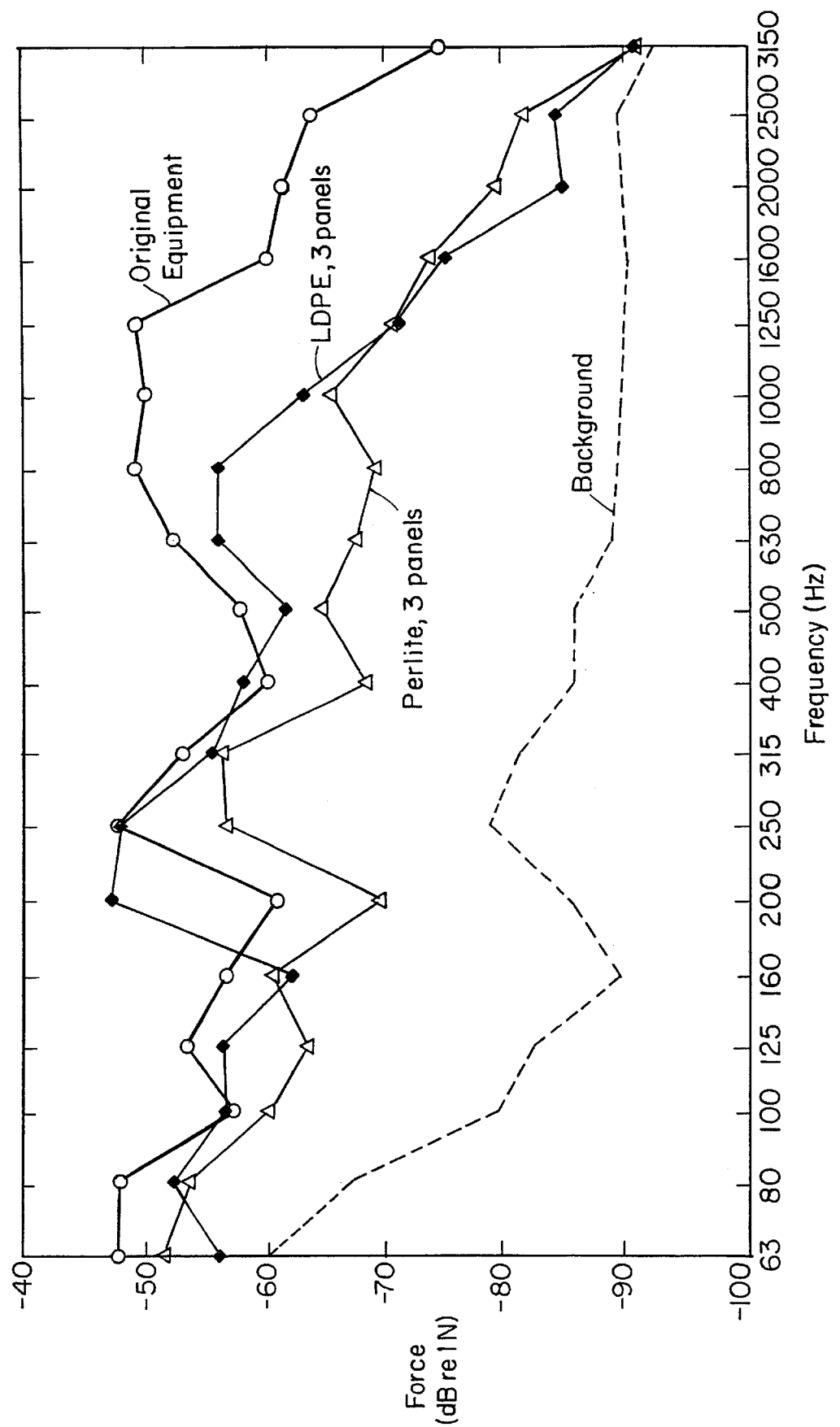
FIG. 15B is a graphical plot illustrating the damping characteristic of a damped housing for cooling fans.

With respect to the damping of structure born noise in a housing that is mechanically coupled to a rotating system, measurements of reduction in structure born sound are shown in the ⅓ octave band results of FIG. 15B of a system like that shown in FIG. 15A. In one embodiment the system is a commercial electronics enclosure 60 excited by three DC brushless fans 62, 64, 66 running at about 1750 rpm. The fans produce force fluctuations on the panel 74 to which they are attached, and these vibrations are coupled throughout the system and result in force fluctuations on the base plate 72 of the equipment. The force fluctuations in the example illustrated in FIG. 15B were measured at each of three mount points upon which the equipment can sit. The circle symbols in FIG. 15B show the averaged force autospectrum of the equipment prior to any modification. The equipment was modified so as to incorporate panels containing LDGF material on two sides 70 and the base 72. The fans are still forcing an unmodified panel at the front end of the enclosure. The solid diamond symbols in FIG. 15B show the reduction in force autospectra when the panels are filled with low-density polyethylene (LDPE) beads. The open triangles show the results when perlite is used. Note that above 1000 Hz the perlite and LDPE produce comparable levels of reduction, about 15–20 dB. Between 100 Hz and 1000 Hz the perlite performs better by 5–10 dB relative to the LDPE. The lower sound speed of perlite (62 m/s) compared to that of LDPE (95 m/s) reduces the coincidence frequency of the radiating plates and hence increases loss at lower frequencies.

Any or all of the housing plates or supporting structures such as beams can be damped as well as the moving elements of the system. In another embodiment, the housing 60 can be an acoustic loudspeaker having a bass transducer 64, a mid-range transducer 66 and a high frequency transducer 62 mounted on a single panel 74. In one embodiment, the four side panels, the top and the bottom can have the damping materials described herein mounted thereon or used to fill internal panel cavities. Damping pads 68 having the low density granular fill material therein can be attached to the bottom panel 72 of the speaker to reduce transmission of vibration from the speaker housing 60 to the floor or other support surface on which the housing is situated. Damping pads can also be attached to internal or external surfaces of a structure and which can be positioned to partially cover the surface. The pads 68 can include a low density granular fill within a plastic bag or film and can be attached with an adhesive such as a single or double sided adhesive tape.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A vibration damped system comprising:

a rotating member having a cavity;

a quantity of low-density granular material contained within the cavity of the member, said low-density granular material having a specific gravity less than 0.6 and being positioned within the member to damp vibrations of the member.

2. The member of claim 1 wherein the a rotating member is a blade.

3. The member of claim 1 further comprising a container containing the low-density granular material which is inserted within the member.

4. The member of claim 3 in which the container is a bag.

5. The member of claim 1 in which the low-density granular material has a sound speed of 90 meters per second or less.

6. The member of claim 5 in which the low-density granular material has a diameter less than 1.0 mm.

7. The member of claim 1 in which the low-density granular material is applied to the member without altering the shape of the member.

8. The member of claim 2 wherein the granular material is dendritic in shape.

9. A method of damping a vibrating member comprising the steps of:

providing the vibrating member, the member having a cavity;

filling the cavity with the low-density granular material having a sound speed of 90 meters per second or less providing relative movement between the member and fluid such that the low-density granular material damps vibration of the member during rotation of the member.

10. The method of claim 9 further comprising the step of providing a distribution of the low-density granular material within the member.

11. The method of claim 9 further comprising the step of filling a container with the low-density granular material and inserting the container in the member.

12. The method of claim 9 in which the low-density granular material comprises a refractory material.

13. The method of claim 12 in which the low-density granular material has a bulk specific gravity in the range of approximately 0.05 to 0.6.

14. The method of claim 9 wherein the low-density granular material is selected from the group consisting of glass, ceramic and plastic.

15. The method of claim 9 further comprising heating the low-density granular material to an operating temperature of at least 900° C. is without altering a shape of the member.

16. A vibration damped rotating system comprising:

a rotating member having a cavity;

a low-density granular material having a specific gravity less than 0.6 and being positioned within the cavity to damp vibrations of the rotating member.

17. The vibration damped system of claim 16 further comprising a rotating shaft attached to a plurality of rotating members, each member having the low-density granular material within a cavity.

18. The vibration damped system of claim 17 wherein the rotating members comprise blades of a turbine.

19. The vibration damped system of claim 17 wherein the rotating shaft contains a low-density granular material that damps vibrations in the shafts.

20. The vibration damped system of claim 16 wherein the low density granular material comprises glass particles.

21. The vibration damped system of claim 16 wherein the low-density granular material comprises ceramic particles.

22. The vibration damped system of claim 16 wherein the low-density granular material comprises plastic particles.

23. The vibration damped system of claim 10 wherein the rotating member comprises a propeller.

24. The vibration damped system of claim 16 wherein the low-density granular material has a dendritic shape.

25. A vibration damped system that is subjected to an external force comprising:
   a first rotating member undergoing vibrations from the external force the first member having a quantity of low density granular material to damp the vibrations; and
   a second member coupled to the first member, the second member having a quantity of low-density granular material coupled to the second member to damp vibrations of the second member, the low density granular material having a sound speed of less than 90 meters per second.

26. The system of claim 25 in which the low-density granular material has a specific gravity less than 0.6.

27. The system of claim 25 wherein the granular material is a refraction material.

28. The system of claim 25 wherein the second member is a housing of the first member.

29. The method of claim 9 further comprising the step of damping mechanical vibrations caused by the rotation of the member.

* * * * *